(12) United States Patent
Nakadai et al.

(10) Patent No.: US 9,055,356 B2
(45) Date of Patent: Jun. 9, 2015

(54) SOUND SOURCE LOCALIZATION APPARATUS AND SOUND SOURCE LOCALIZATION METHOD

(75) Inventors: Kazuhiro Nakadai, Wako (JP); Hirofumi Nakajima, Wako (JP); Keisuke Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 754 days.

(21) Appl. No.: 12/791,423

(22) Filed: Jun. 1, 2010

(65) Prior Publication Data

US 2010/0329479 A1 Dec. 30, 2010

Related U.S. Application Data

(60) Provisional application No. 61/217,803, filed on Jun. 4, 2009.

(51) Int. Cl.
*H04B 15/00* (2006.01)
*H04R 3/00* (2006.01)
*B25J 9/00* (2006.01)

(52) U.S. Cl.
CPC .. *H04R 3/005* (2013.01); *B25J 9/00* (2013.01)

(58) Field of Classification Search
CPC ............. H04R 9/005; H04R 2201/401; H04R 2201/403; H04R 2430/20; H04R 2499/11; H04R 2499/15; H04R 19/005; H04R 1/32; H04R 1/406; H04R 1/46; H04R 2225/43
USPC ......... 381/97, 92, 98, 122, 113, 111, 114, 56, 381/58, 303, 103–107, 1, 94.1, 310, 381/94.2–94.8, 71.1–71.6; 342/417; 704/225, 226, 233
See application file for complete search history.

(56) References Cited

U.S. PATENT DOCUMENTS

| 6,157,403 | A * | 12/2000 | Nagata ........................... 348/171 |
| 6,504,490 | B2 * | 1/2003 | Mizushima ..................... 340/943 |
| 8,189,765 | B2 * | 5/2012 | Nishikawa et al. ....... 379/406.01 |
| 2008/0001821 | A1 * | 1/2008 | Tanaka ........................... 342/417 |
| 2008/0089531 | A1 * | 4/2008 | Koga et al. ...................... 381/92 |
| 2010/0202633 | A1 * | 8/2010 | Kim et al. ...................... 381/107 |

FOREIGN PATENT DOCUMENTS

WO 2006/030834 A1 3/2006

OTHER PUBLICATIONS

Nakadai, Kazuhiro et al., "Active Audition for Humanoid," Proceedings of 17th National Conference on Artificial Intelligence, AAAI-2000, 8 pages, (2000).

(Continued)

*Primary Examiner* — Lun-See Lao
(74) *Attorney, Agent, or Firm* — Nelson Mullins Riley & Scarborough LLP; Anthony A. Laurentano

(57) ABSTRACT

A sound source localization apparatus for localizing a sound source using an eigenvector, includes, a sound signal input unit inputting a sound signal, a correlation matrix calculation unit calculating a correlation matrix of the input sound signal, and an eigenvector calculation unit calculating an eigenvalue of the correlation matrix using the calculated correlation matrix, wherein the eigenvector calculation unit calculates the eigenvector using the correlation matrix of the input sound signal and one or more predetermined correlation matrices.

4 Claims, 19 Drawing Sheets

(56) References Cited

OTHER PUBLICATIONS

Roy, R. et al., "ESPRIT—A Subspace Rotation Approach to Estimation of Parameters of Cisoids in Noise," IEEE Transactions on Acoustics, Speech, and Signal Processing, vol. ASSP-34(5):1340-1342 (1986).

Asano, Futoshi et al., "Localization and Extraction of Brain Activity Using Generalized Eigenvalue Decomposition,"IEEE International Conference on Acoustics, Speech and Signal Processing, ICASSP 2008, pp. 565-568 (2008).

Inagaki, Yoshiyuki et al., "DOA Estimation of Desired Signals by Cyclic ESPRIT Based on Noise Subspace and Its Performance Improvement," Journal of the Institute of Electronics, Information and Communication Engineers, vol. J88-B(9):1780-1788 (2005).

Japanese Office Action for Application No. 2010-124874, 7 pages, dated Sep. 10, 2013.

* cited by examiner

FIG. 4

| | |
|---|---|
| $M$ | NUMBER OF MICROPHONES |
| $L$ | NUMBER OF SOUND SOURCES |
| $m$ | INDEX OF MICROPHONE ($1 \leq m \leq M$) |
| $l$ | INDEX OF SOUND SOURCE ($1 \leq l \leq L$) |
| $\theta_l$ | DIRECTION OF $l$-th SOUND SOURCE (DEGREE) |
| $\phi$ | ORIENTATION OF ROBOT HEAD (DEGREE) |
| $\Psi$ | ORIENTATION OF STEERING VECTOR (DEGREE) |
| $S_l(\omega, \theta_l)$ | SIGNAL OF $l$-th SOUND SOURCE IN FREQUENCY DOMAIN |
| $s_l(\omega, \theta_l)$ | $S_l(\omega, \theta_l)$ IN TIME DOMAIN |
| $N_m(\omega, \phi)$ | ADDITIVE NOISE MEASURED (INPUT) BY $m$-th MICROPHONE WITH HEAD DIRECTION $\phi$ |
| $N(\omega, \phi)$ | $[N_1(\omega, \phi), N_2(\omega, \phi), \cdots, N_M(\omega, \phi)]^T$ |
| $n_m(t, \phi)$ | $N_m(\omega, \phi)$ IN TIME DOMAIN |
| $n(t, \phi)$ | $[n_1(\omega, \phi), n_2(\omega, \phi), \cdots, n_M(\omega, \phi)]^T$ |
| $A_{m,l}(\omega, \phi, \theta_l)$ | TRANSFER FUNCTION BETWEEN $l$-th SOURCE AND $m$-th MICROPHONE WHEN HEAD ORIENTATION IS $\phi$ |
| $A_l(\omega, \phi, \theta_l)$ | $[A_{1,l}(\omega, \phi, \theta_l), \cdots, A_{M,l}(\omega, \phi, \theta_l)]^T$ |
| $a_{m,l}(t, \phi, \theta_l)$ | $A_{m,l}(\omega, \phi, \theta_l)$ IN TIME DOMAIN |
| $X_m(\omega)$ | SIGNAL MEASURED BY $m$-th MICROPHONE IN FREQUENCY DOMAIN |
| $X(\omega)$ | $[X_1(\omega), X_2(\omega), \cdots, X_M(\omega)]^T$ |
| $x_m(t)$ | $X_m(\omega)$ IN TIME DOMAIN |
| $x(t)$ | $[x_1(\omega), x_2(\omega), \cdots, x_M(\omega)]^T$ |
| $G(\omega, \Psi)$ | STEERING VECTOR IN DIRECTION OF $\Psi$ |
| $R(\omega, \phi)$ | CORRELATION MATRIX ($\in C^{M \times M}$) |
| $e_m(\omega, \phi)$ | EIGENVECTOR OF $R(\omega, \phi)$ |
| $E(\omega, \phi)$ | EIGENVECTOR MATRIX $[e_1, \cdots, e_M]$ |
| $\lambda_m$ | EIGENVALUE OF $R(\omega, \phi)$ ($\lambda_1 \geq \lambda_2 \geq \cdots \geq \lambda_M$) |
| $\Lambda$ | DIAGONAL MATRIX ($\lambda_1, \cdots, \lambda_M$) |

FIG. 5

| | |
|---|---|
| $R(\omega, \phi)$ | CORRELATION MATRIX OF MEASURED SIGNALS (INPUT SIGNALS) |
| $K(\omega, \phi)$ | NOISE CORRELATION MATRIX |
| $C_l(\omega, \phi)$ | CORRELATION MATRIX FOR l-th SIGNAL |
| $R_l(\omega, \phi)$ | CORRELATION MATRIX OF MEASURED SIGNALS WHEN l-th SOUND IS DETECTED |
| $V(\omega, \phi)$ | DESIGNED CORRELATION MATRIX |
| $D_l$ | DECAY PARAMETER FOR l-th SOUND ($-1 \leq D_l \leq 1$) |
| $e_{l,m}(\omega, \phi)$ | EIGENVECTOR OF $C_l(\omega, \phi)$ |
| $E_l(\omega, \phi)$ | EIGENVECTOR MATRIX $[e_{l,1}, \cdots, e_{l,M}]$ |
| $\lambda_{l,m}(\omega, \phi)$ | EIGENVALUE OF $C_l(\omega, \phi)$ ($\lambda_{l,1} \geq \lambda_{l,2} \geq \cdots \geq \lambda_{l,M}$) |
| $\Lambda_l$ | DIAGONAL MATRIX ($\lambda_{l,1}, \cdots, \lambda_{l,M}$) |
| $\hat{C}_l(\omega, \phi, \phi')$ | ESTIMATED CORRELATION MATRIX OF l-th SIGNAL FROM $\phi$ TO $\phi'$ |
| $I$ | M-DIMENSIONAL UNIT MATRIX |
| $C_l^{Dl}(\omega, \phi)$ | CORRELATION MATRIX IN DYNAMIC FoA FOR l-th SIGNAL |

FIG. 9A
MUSIC and GEVD ($s_1$(t, -60) with ø = 0 [deg])
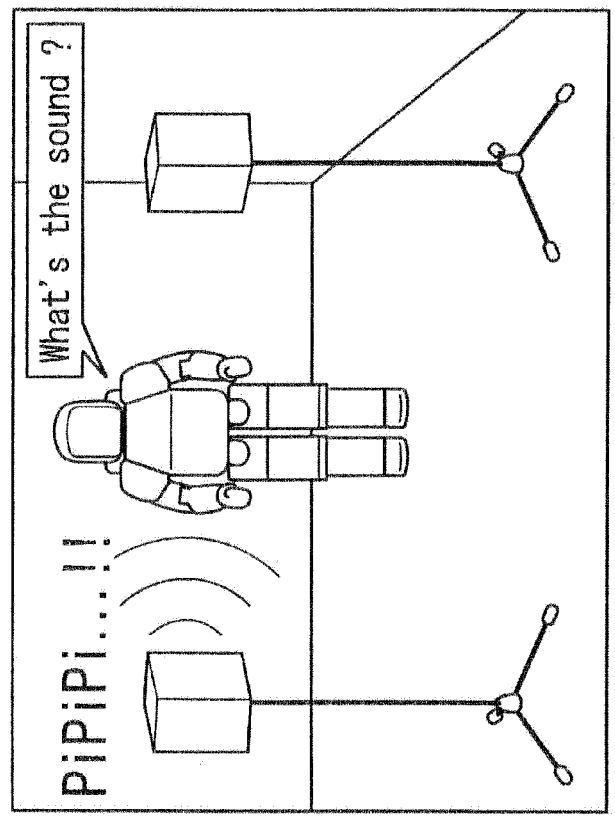
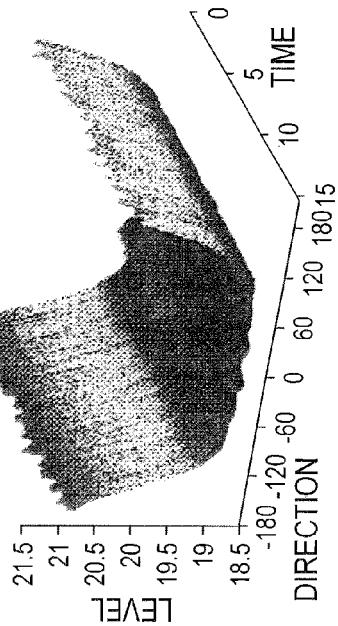

Target Source Selection ($s_1(t, -60)$ and $s_2(t, 60)$ with ø + -60 [deg])

FIG. 9D
Correlation Matrix Estimation ($s_1(t, -60)$ and $s_2(t, 60)$ with $\varnothing = 60$ [deg])
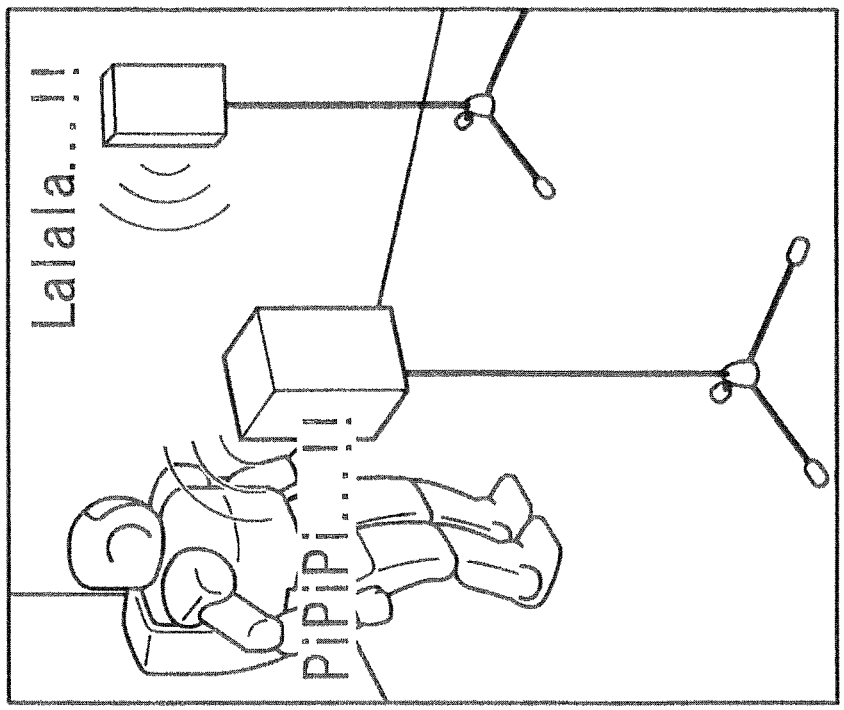
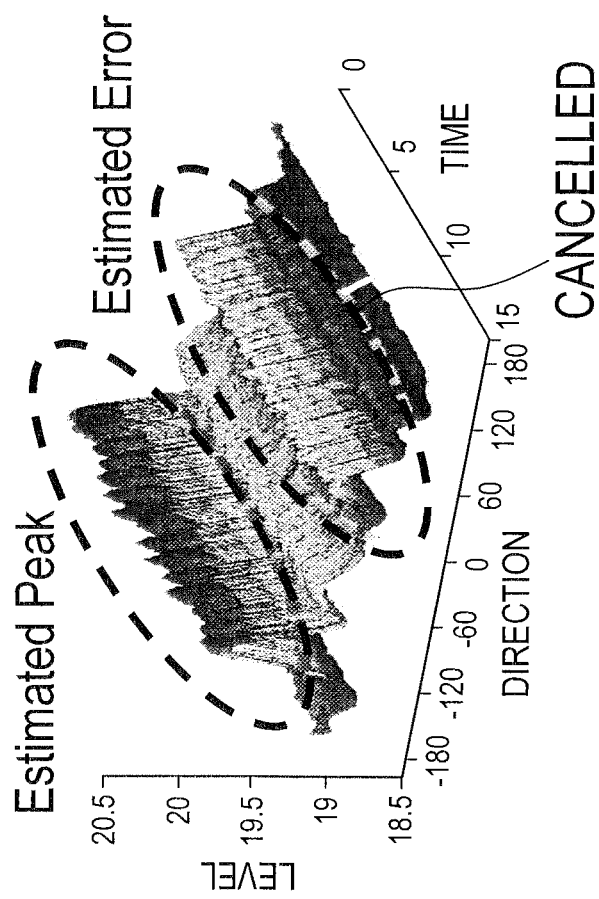
Correlation Matrix Estimation
$$V(\omega, 60) = \hat{C}_2^{-1}(\omega, -60, 60)K^{-1}(\omega, 60)$$

FIG. 10A $C_2^{-1} K^{-1} \hat{R} e_m = \hat{\lambda}_m \hat{e}_m$

| SOUND SOURCE 1 + SOUND SOURCE 2 + NOISE n | − | SOUND SOURCE 2 | − | NOISE n | = | SOUND SOURCE 1 |

FIG. 10B $C_1^{-1} K^{-1} \hat{R} e_m = \hat{\lambda}_m \hat{e}_m$

| SOUND SOURCE 1 + SOUND SOURCE 2 + NOISE n | − | SOUND SOURCE 1 | − | NOISE n | = | SOUND SOURCE 2 |

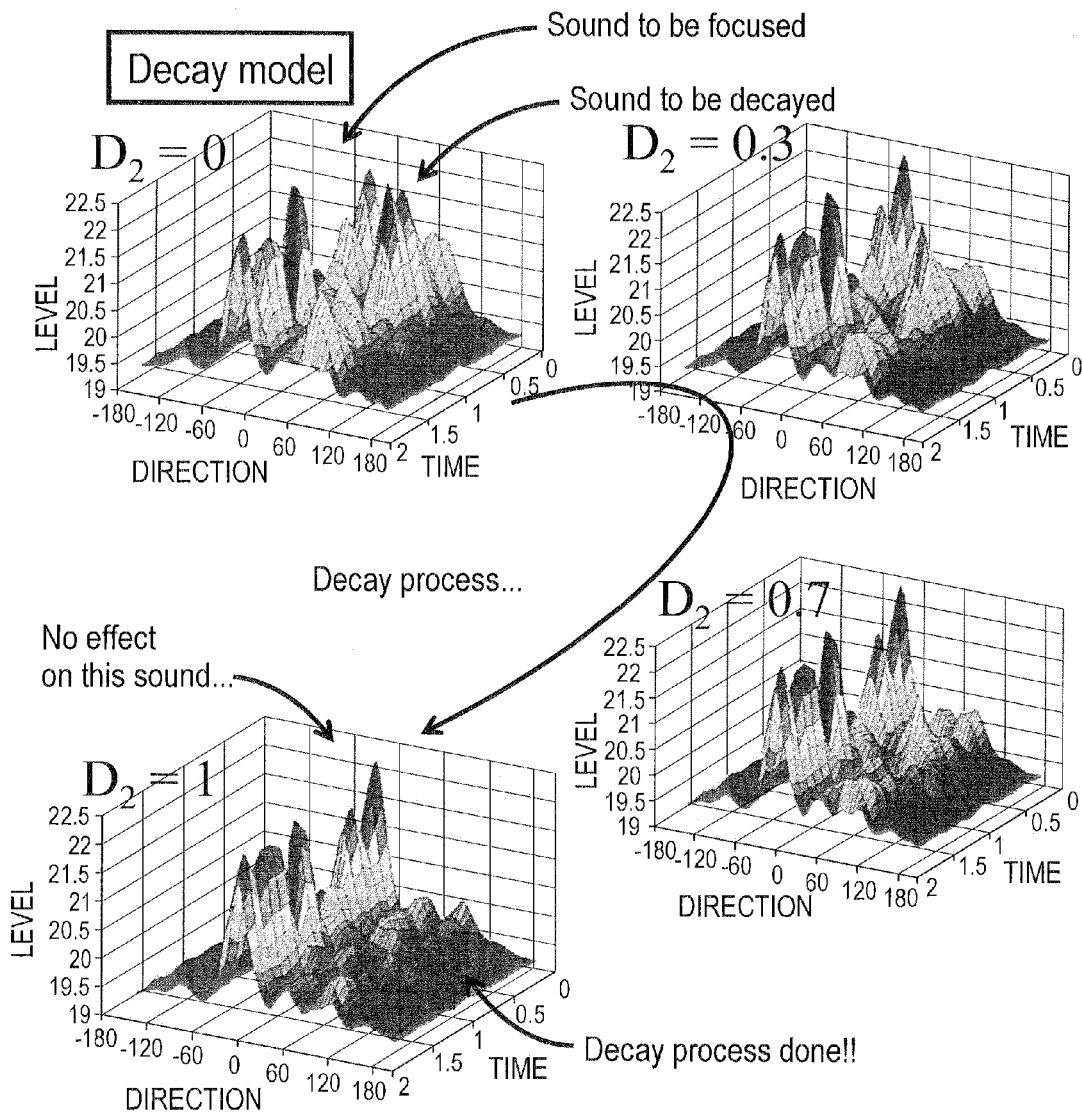

SOUND SOURCE LOCALIZATION APPARATUS AND SOUND SOURCE LOCALIZATION METHOD

CROSS REFERENCE TO RELATED APPLICATIONS

This application claims benefit from U.S. Provisional application Ser. No. 61/217,803, filed Jun. 4, 2009, the contents of which are incorporated herein by reference.

BACKGROUND OF THE INVENTION

1. Field of the Invention

The present invention relates to a sound source localization apparatus and a sound source localization method.

2. Description of the Related Art

In recent years, robot technology has rapidly progressed and more and more robots such as humanoid robots work with humans. For practical use of the robots, "robot audition" has attracted great attention and various proposals have been made (for example, see K. Nakadai et al., "Active Audition for Humanoid", in Proc. of 7th National Conf. on Artificial Intelligence (AAAI 2000), pp. 832-839, 2000). Sound source orientation, that is, estimation of sound source localization, is one of the most fundamental processes for robot audition. The subsequent processes such as sound source separation and speech recognition are induced from the results of the sound source localization.

A multiple signal classification (MUSIC) method is one sound source localization sound orientation method used in real world application examples such as robots. The MUSIC method has a merit in that it is easier to detect peaks of the spatial spectrum when compared with other known methods.

SUMMARY OF THE INVENTION

However, the MUSIC method is focused on static conditions, and is established on the premise that target sound sources are stronger than noise sources. That is, in the MUSIC method, the sound source orientation of a target is estimated by assuming that a sound source having a great eigenvalue is a target and a sound source having a small eigenvalue is a noise. Therefore, for example, in a system having a stationary noise source with a large amount of power, such as a moving type robot having a heat-dissipating fan, since the influence of noises is great and the above-mentioned assumption is not satisfied, there is a problem that the sound source orientation cannot be estimated correctly.

In a moving type robot having a microphone in its rotatable head, since a correlation matrix for the sound source with the rotation of the head is different from the correlation matrix without the rotation of the head, there is a problem in that it is necessary to prepare for various correlation matrices corresponding to the rotation of the head in advance, and a lot of data must be stored.

The present invention was made in consideration of the above-mentioned problems, and it is an object of the invention to provide a technique of correctly localizing a sound source orientation in a system having a stationary noise source.

To accomplish the above-mentioned object, according to a first aspect of the sound source localization apparatus, there is provided a sound source localization apparatus for localizing a sound source using an eigenvector, including: a sound signal input unit (e.g., a microphone array 100 in an embodiment) inputting a sound signal; a correlation matrix calculation unit (e.g., a correlation matrix calculator 110 in an embodiment) calculating a correlation matrix of the input sound signal; and an eigenvector calculation unit (e.g., an eigenvector calculator 120 in an embodiment) calculating an eigenvalue of the correlation matrix using the calculated correlation matrix. Here, the eigenvector calculation unit calculates the eigenvector using the correlation matrix (e.g., a correlation matrix R in an embodiment) of the input sound signal and one or more predetermined correlation matrices (e.g., a correlation matrix K and correlation matrix C in an embodiment).

In a sound source localization apparatus according to a second aspect of the invention, the eigenvector calculation unit may include a correction unit correcting a predetermined correlation matrix and changes the eigenvector of the predetermined correlation matrix.

In a sound source localization apparatus according to a second aspect of the invention, the sound source localization apparatus may further include a microphone posture information storage unit (e.g., a driving controller 140 or eigenvector calculator 120 in an embodiment) storing microphone posture information indicating a microphone posture. Here, the eigenvector calculation unit may correct the correlation matrix on the basis of the microphone posture information.

According to a fourth aspect of the invention, there is provided a sound source localization method of localizing a sound source using an eigenvector, including: a sound signal input step of inputting a sound signal; a correlation matrix calculation step of calculating a correlation matrix of the input sound signal; and an eigenvector calculation step of calculating an eigenvalue of the correlation matrix using the calculated correlation matrix. In the eigenvector calculation step, the eigenvector is calculated using the correlation matrix of the input sound signal and one or more predetermined correlation matrices.

According to the sound source localization apparatus of the first aspect, because the eigenvector for localizing a sound source is calculated using a predetermined correlation matrix (e.g., a correlation matrix K in an embodiment), a sound source localization can be performed while reducing the effect of stationary noise. In other words, a sound source can be correctly localized in a system having a stationary noise source.

In addition, because the eigenvector for localizing a sound source is calculated using a predetermined correlation matrix (e.g., a correlation matrix C in an embodiment), a localization for a specific sound source can be performed while reducing the effect of other sound sources. In other words, a sound source can be correctly localized in a system having a plurality of sound sources.

According to the sound source localization apparatus of the second aspect, because the predetermined correlation matrix (e.g., a correlation matrix C in an embodiment) is corrected, a target sound source can be appropriately separated and recognized in subsequent processes such as a sound source separation process, or a speech recognition process. For example, a recognition process can be appropriately performed depending on the degree of interest in the sound sources.

According to the sound source localization apparatus of the third aspect, because the predetermined correlation matrix (e.g., a correlation matrix C in an embodiment) is corrected based on the microphone posture information, a sound source can be correctly localized in accordance with the microphone posture even when the microphone posture is changed. In other words, because it is not necessary to prepare various correlation matrices beforehand depending on the microphone posture, a sound source can be correctly localized in accordance with the microphone posture while reducing the amount of data to be stored.

According to the sound source localization method of the fourth aspect, an effect similar to that in the first aspect can be obtained.

BRIEF DESCRIPTION OF THE DRAWINGS

FIG. 4 is a diagram illustrating various parameters used in the description.

FIG. 5 is a diagram illustrating various parameters additionally used in the description.

FIGS. 9A, 9B, 9C, and 9D are diagrams illustrating snapshots in a test of the selective attention system.

FIGS. 10A, 10B, and 10C are diagrams schematically illustrating the functions of an eigenvector calculator and the like.

FIGS. 11A and 11B are diagrams schematically illustrating the functions of the eigenvector calculator and the like.

FIGS. 12A and 12B are diagrams schematically illustrating the functions of the eigenvector calculator and the like.

DETAILED DESCRIPTION OF THE INVENTION

Hereinafter, an embodiment of the invention will be described.

Outline of a Sound Source Localization Apparatus

Figure 1:
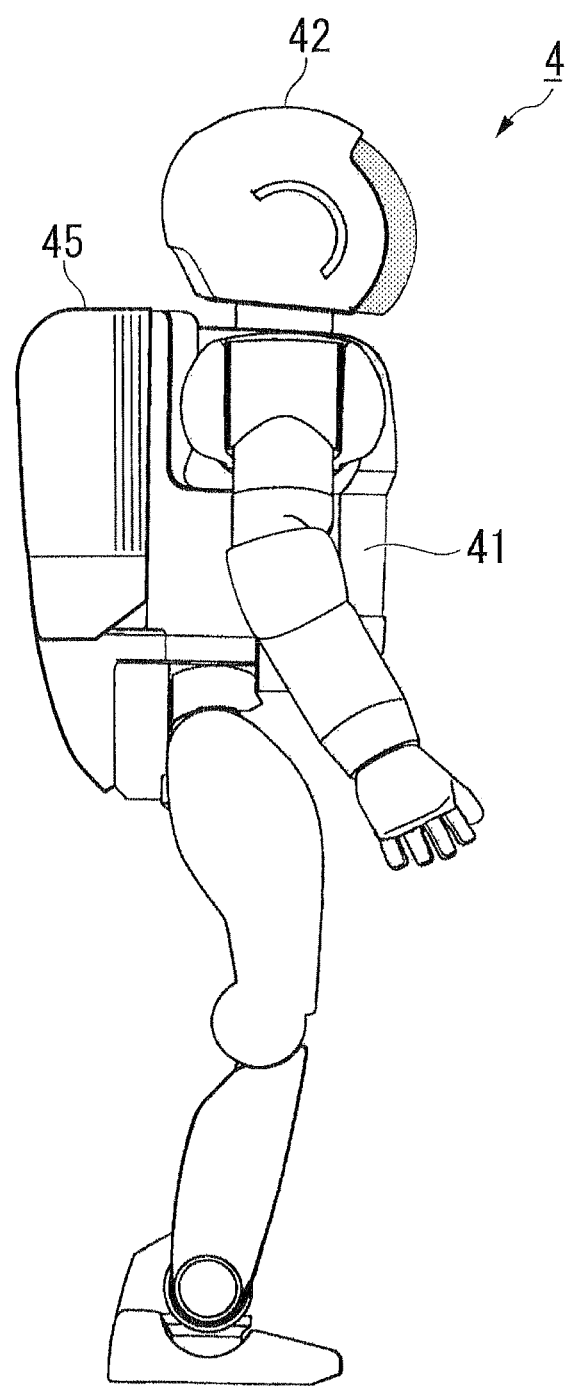
FIG. 1 is a side view schematically illustrating a robot provided with a sound source localization apparatus according to an embodiment of the invention.
Figure 2:
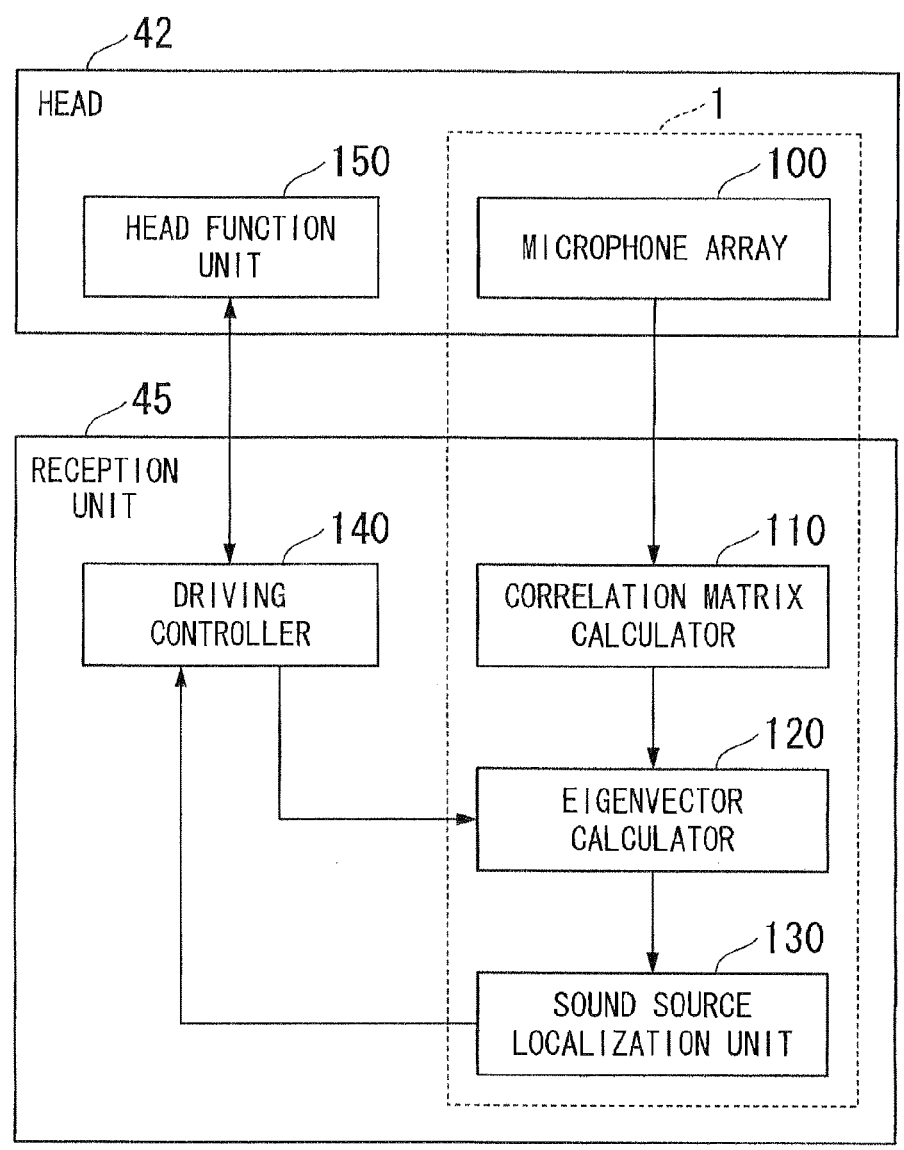
FIG. 2 is a block diagram schematically illustrating a configuration of the robot.

A sound source localization apparatus 1 according to an embodiment of the invention, specifically, a robot 4 provided with the sound source localization apparatus 1 according to the embodiment, will be roughly described with reference to FIGS. 1 and 2. FIG. 1 is a side view schematically illustrating the robot 4 provided with the sound source localization apparatus 1 according to this embodiment. FIG. 2 is a block diagram illustrating the configuration of the robot 4. As shown in FIG. 1, the robot 4 includes a body 41, a head 42 movably connected to the body 41, and a reception part 45.

As shown in FIG. 2, the robot 4 includes a microphone array 100 (sound signal input unit) and a head function unit 150 in the head 42. The robot 4 includes a correlation matrix calculator 110 (correlation matrix calculation unit), an eigenvector calculator 120 (eigenvector calculation unit and microphone posture information storage unit), a sound source localization unit 130, and a driving controller 140 in the reception unit 45. As indicated by a dotted line, the microphone array 100, the correlation matrix calculator 110, the eigenvector calculator 120, and the sound source localization unit 130 constitute the sound source localization apparatus 1.

The driving controller 140 outputs a control signal to the head function unit 150 to control the driving of the head 42. For example, the driving controller 140 outputs the control signal to the head function unit 150 on the basis of sound source direction information (to be described later) output from the sound source localization unit 130 as well as a command received from the outside via a command receiving unit (not shown).

The head function unit 150 controls the rotation of the head 42 on the basis of the control signal from the driving controller 140. The orientation (the posture of the microphone array 100) of the microphone array 100 mounted on the head 42 is changed with the rotation of the head 42.

The microphone array 100 includes plural microphones and collects plural sounds by the use of the microphones. That is, the microphone array 100 receives plural sound signals. Specifically, the microphone array 100 receives sound signals from various sound sources. The sound sources include target sound sources (also referred to as "sound sources") generating a sound signal (hereinafter, referred to as "target sound signal") to be originally acquired and noise sources generating a sound signal (noise) not to be originally acquired. The noise sources include external noise sources and internal noise sources of the robot 4. A heat-dissipating fan (not shown) mounted on the reception unit 45 is an example of the internal noise source of the robot. The microphone array 100 outputs the input sound signals to the correlation matrix calculator 110.

The correlation matrix calculator 110 calculates a correlation matrix of the sound signals input from the microphone array 100. The correlation matrix calculator 110 outputs the calculated correlation matrix to the eigenvector calculator 120.

The eigenvector calculator 120 calculates an eigenvector using the correlation matrix. For example, the eigenvector calculator 120 calculates the eigenvector of the correlation matrix using the correlation matrix (the correlation matrix of the input signals) calculated by the correlation matrix calculator 110. For example, the eigenvector calculator 120 calculates the eigenvector of the correlation matrix of the input signals and other eigenvectors using the correlation matrix of the input signals and one or more predetermined correlation matrices. The eigenvector calculator 120 outputs the calculated eigenvectors to the sound source localization unit 130.

The eigenvector calculator 120 corrects the predetermined correlation matrices to change the eigenvectors of the predetermined correlation matrices. When the eigenvectors are changed, the eigenvector calculator 120 outputs the changed eigenvectors to the sound source localization unit 130. The eigenvectors of the predetermined correlation matrices are changed by the correction of the eigenvector calculator 120, thereby adjusting the intensity of the measured signals (plural sound signals (target sound signals and noise signals) collected by the microphone array 100). The details of the predetermined correlated matrices and the eigenvector calculator 120 will be described later.

The sound source localization unit 130 localizes the sound source using the eigenvectors. The sound source localization unit 130 outputs sound source direction information indicating the localized sound source direction to the driving controller 140. The details of the sound source localization unit 130 will be described later.

Figure 3:
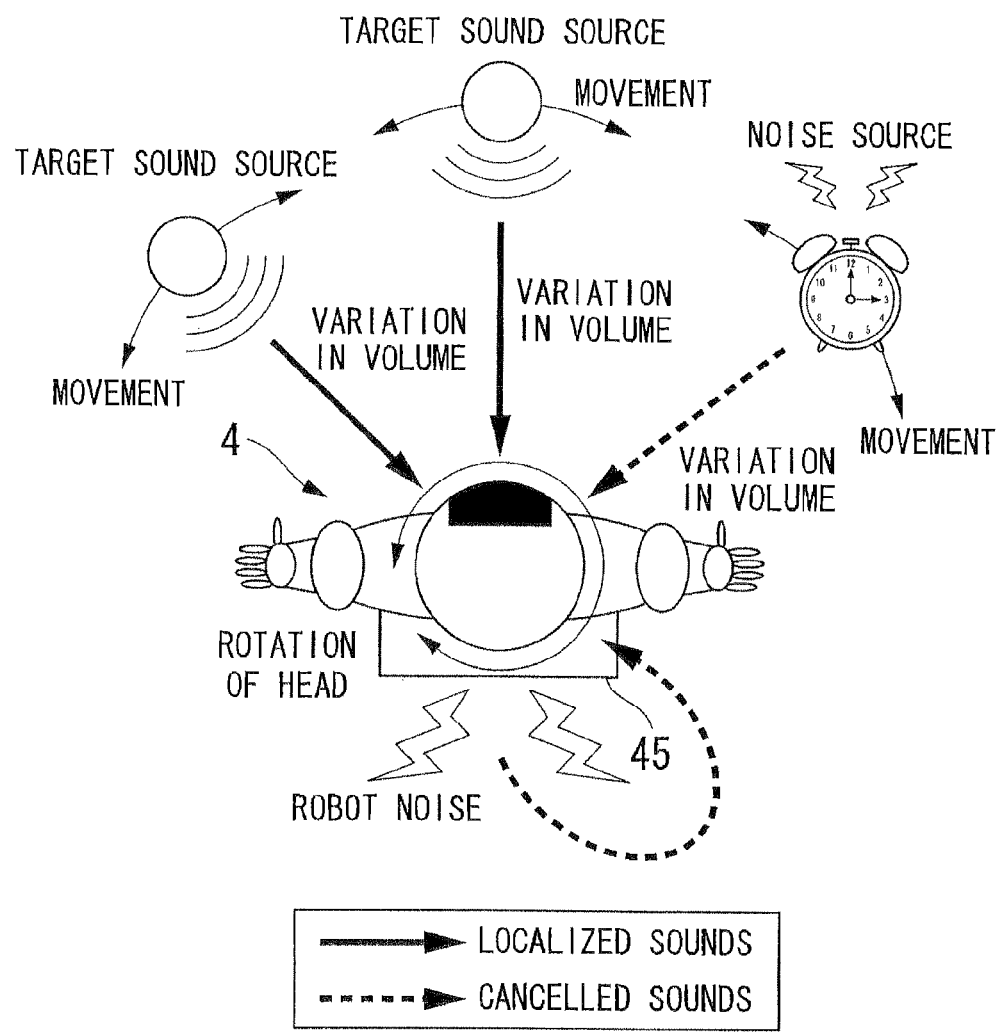
FIG. 3 is a diagram schematically illustrating the robot and surrounding environments of the robot.

FIG. 3 is a diagram schematically illustrating the robot 4 and the surrounding environment of the robot 4. As shown in FIG. 3, the robot 4 is placed in environments of external target sound sources, noises from a fan in the reception unit 45 as an internal noise source, external noise sources, and the like. The external sound sources can move in any direction and the volumes thereof vary.

Techniques for Sound Source Localization Apparatus

Technical details (including technical details serving as a basis of the sound source localization apparatus 1 according to this embodiment) of the sound source localization apparatus 1 according to this embodiment will be described in detail with reference to FIGS. 4 to 9.

A common signal model will be first described. FIG. 4 is a diagram illustrating various parameters used in the following description. The model of signal $x_m(t)$ measured by each microphone is considered as a linear receiving system like Expression 1.

$$x_m(t) = \sum_{l=1}^{L} \{a_{m,l}(t, \phi, \theta_l)s_l(t, \theta_l)\} + n_m(t, \phi) \qquad \text{Expression 1}$$

As shown in FIG. 4, m is an index of a microphone, l is an index of a sound source, t is time, φ is the orientation of the robot head, $\theta_l$ is the direction of the l-th sound source, $s_l(t,\theta_l)$ is the signal of the l-th sound source in the time domain, and $n_m(t,\phi)$ is the additive noise mainly in respect of environmental noises. x(t) is changed to Expression 2 by the Fourier Transform.

$$X(\omega) = \sum_{l=1}^{L} \{A_l(\omega, \phi, \theta_l)S_l(\omega, \theta_l)\} + N(\omega, \phi) \qquad \text{Expression 2}$$

In the MUSIC method used for the localization, a steering vector $G(\omega,\psi)$ is calculated before the localization as described below. When it is assumed that the orientation of the head is φ=0, the number of sound sources is L=1, and the noise is $n_m(t,\phi)$=0 and the sound source signal $s_l(t,\theta_l)$ is an impulse signal, the Fourier transform of $x_m(t)=a_{m,l}(t,0,\theta_l)s_l(t,\theta_l)$ is expressed by Expression 3.

$$X(\omega)=A_1(\omega,0,\theta_1)S_1(\omega,\theta_1)=A_1(\omega,0,\theta_1) \qquad \text{Expression 3}$$

Since the sound signal is $S_l(\omega,\theta_l)$=1, $X(\omega)$ in the l-th sound source direction $\theta_l$ is defined as a steering vector. Accordingly, the steering vector $G(\omega,\psi)$ is defined as a steering vector at each ψ before measuring the sound source direction θ, that is, before the localization, by Expression 4.

$$G(\omega,\psi)=A_1(\omega,0,\psi) \qquad \text{Expression 4}$$

During the localization, x(t) is measured at the sampling time τ (Notice that now $n_m(t,\phi)$ of Expression 1 cannot be assumed to be zero.). When x(τ) having been subjected to the Fourier transform is X(ω,τ), the correlation matrix R(ω,φ) of x(τ) is expressed by Expression 5.

$$R(\omega,\phi)=X(\omega,\tau)X^*(\omega,\tau) \qquad \text{Expression 5}$$

Here, ( )* represents the complex conjugate transpose operator.

When φ=0 is assumed for the simplicity, the eigenvalue decomposition (SEVD) of R(ω,φ) is expressed by Expression 6.

$$R(\omega,\phi)=E(\omega,\phi)\Lambda E^{-1}(\omega,\phi) \qquad \text{Expression 6}$$

Here, Λ is diag($\lambda_1, \lambda_2, \ldots, \lambda_M$) having the values of R(ω,φ) (where $\lambda_1 \geq \lambda_2 \geq \ldots \geq \lambda_M$). Since $\lambda_m$ represents the intensity of a sound source, $\lambda_i$ and $e_i$(1≤i≤L) are the eigenvalue and the eigenvector of the sound source. $\lambda_i$ and $e_i$(L+1≤i≤M) are the eigenvalues and the eigenvectors of noises.

Accordingly, in a specific spectrum, specifically, in the steering expression P(ω,ψ) expressed by Expression 7, when the steering vector G(ω,ψ) correctly indicates the sound source direction, $G(\omega,\psi)e_m$=0 and thus the peak is infinite.

$$P(\omega, \psi) = \frac{|G^*(\omega, \psi)G(\omega, \psi)|}{\sum_{m=L+1}^{M} |G^*(\omega, \psi)e_m|} \qquad \text{Expression 7}$$

As described above, in the MUSIC method based on the eigenvalue decomposition (SEVD), since it provides easy detectable and reliable peaks, it has been used for the robotic localization. It also realizes the easy implementation for robots in terms of the numerical algorithm. Since noises cannot be assumed to be white noises in the real world, the noises and the sound sources are correlated with each other and thus the peaks are not infinite.

As described above, the MUSIC method properly works in localization only when the assumption that the sound sources are stronger than the noise sources is satisfied. In the robotic localization, this problem is not avoidable since N(ω,ψ) of Expression 2 is greater than the first term in many cases. Therefore, since some of $e_i$(1≤i≤L) are chosen from noises, Expression 7 returns undesired peaks.

FIG. 5 is a diagram illustrating various parameters additionally used in the following description. The sound source localization apparatus 1 according to this embodiment employs a MUSIC method based on GEVD (generalized eigenvalue decomposition) instead of the MUSIC method based on the eigenvalue decomposition (SEVD). That is, the sound source localization apparatus 1 according to this embodiment employs the GEVD utilizing more noise correlation matrices to reduce the environmental noises. In the below description, the MUSIC method based on the SEVD is called a MUSIC method and the MUSIC method based on the GEVD is called a GEVD method. The mathematical characteristics of the GEVD are described in G. Strang, Linear Algebra and its Applications Third Edition, Harcount Brace Jovanovich, 1998.

In the sound source localization apparatus 1 according to this embodiment, the correlation matrices for the GEVD are dynamically designed to select sounds to be cancelled or focused. Hereinafter, the function of cancelling or focusing sounds is called "target source selection". In the sound source localization apparatus 1 according to this embodiment, correlation matrices in which the degree of cancel or focusion is controlled are designed in terms of the target source selection. Hereinafter, the function of controlling the degree of cancellation or focusing is called "dynamic FoA". The localization performed by humans is implemented by the dynamic FoA. Hereinafter, the localization performed by humans is called "intelligent localization".

The sound source localization apparatus 1 according to this embodiment employs the dynamic transformation of correlation matrices with the change in head orientation in consideration of the rotation of the robot head, that is, the change in head orientation. Hereinafter, the transformation or the localization using the transformed correlation matrices is called "correlation matrix estimation". The system including the GEVD, the target source selection, the dynamic FoA, and the correlation matrix estimation is called "selective attention system".

Figure 6:
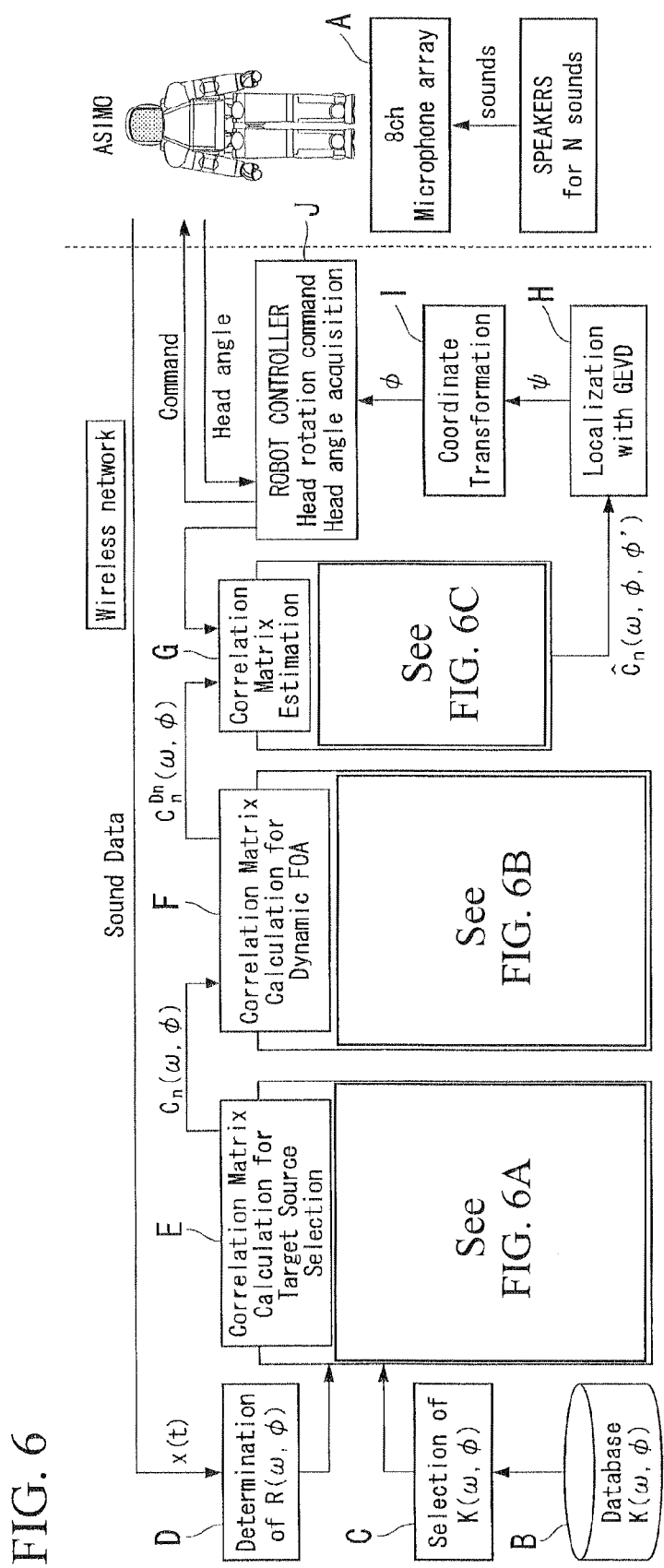
FIG. 6 is a diagram schematically illustrating the architecture of a selective attention system.
Figure 6A:
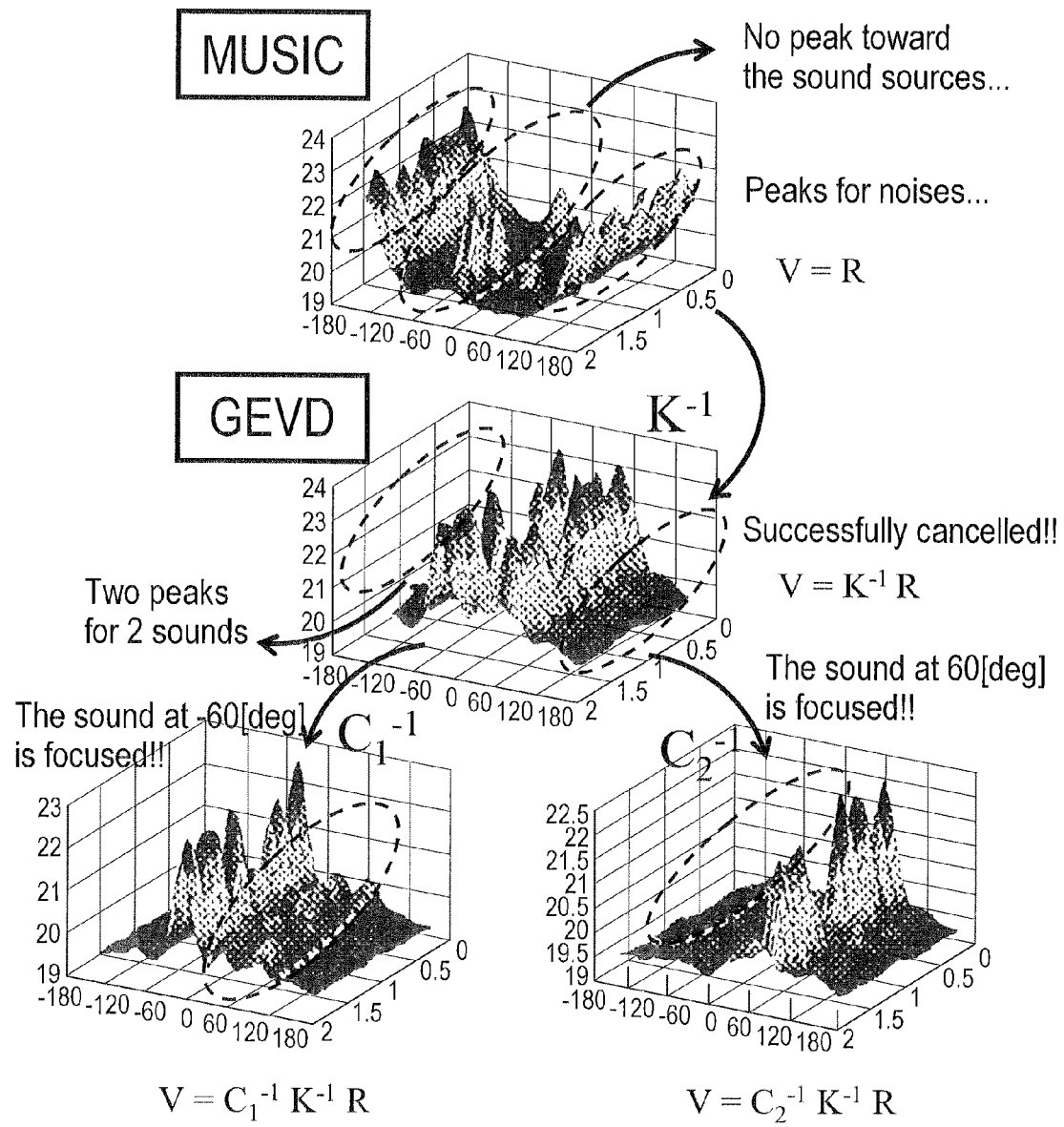
Figure 6B:
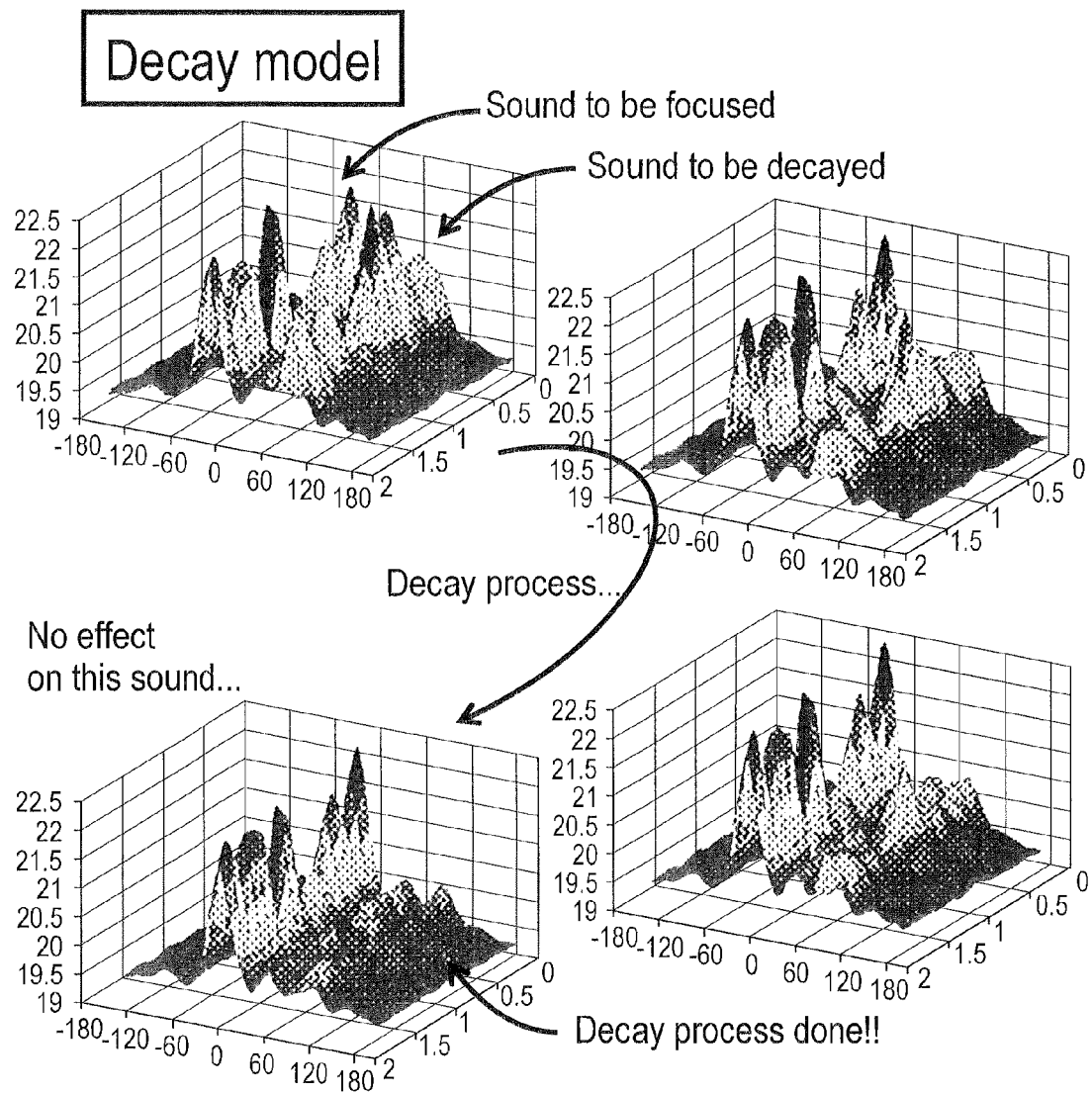
Figure 6C:
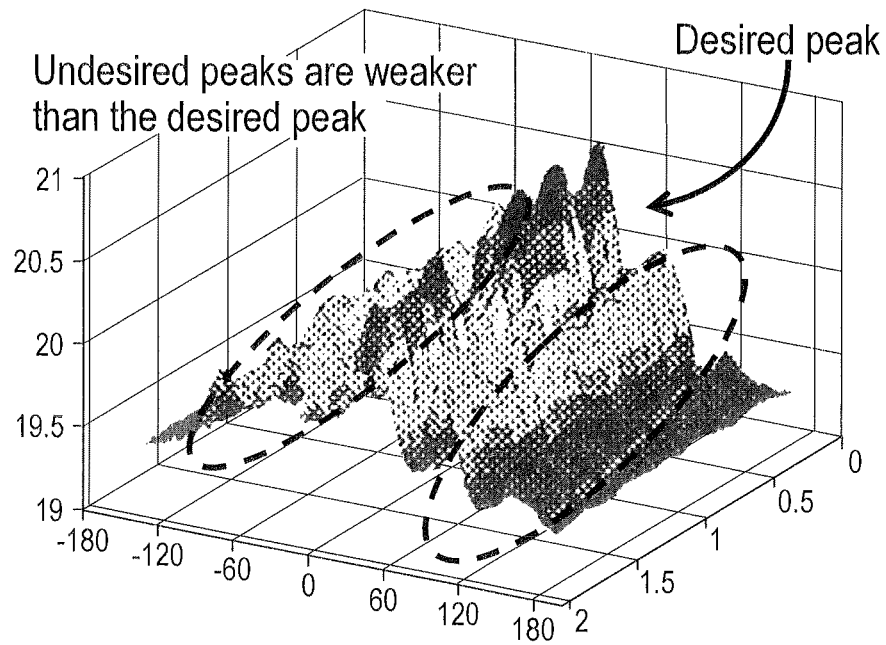

FIG. 6 is a diagram schematically illustrating an architecture of the selective attention system. In FIG. 6, the GEVD corresponds to functions A to J (mainly, functions B, C, D, and H), the target source selection corresponds to function E, the dynamic FoA corresponds to function F, and the correlation matrix estimation corresponds to function G. Functions A to J are mounted on the robot 4. The GEVD, the target source selection, the dynamic FoA, and the correlation matrix estimation will be described in detail below.

GEVD

The GEVD method is used to solve the problem of the MUSIC method. When the power of noises is stronger than the power of the target sounds, the problem is that the eigenvectors $e_1, \ldots, e_L$ of noises are selected as described above. The way to solve this problem is to define the correlation matrix $K(\omega,\phi)$ of noises $N(\omega,\phi)$ as expressed by Expression 8.

$$K(\omega,\phi)=N(\omega,\phi)N^*(\omega,\phi) \quad \text{Expression 8}$$

$N(\omega,\phi)$ is measured using $S_l(\omega,\theta_l)=0$ in Expression 2. Accordingly, in the GEVD method, $R(\omega,\phi)$ is expressed by Expression 9.

$$R(\omega,\phi)\hat{e}_n(\omega,\phi)=\hat{\lambda}_m K(\omega,\phi)\hat{e}_m(\omega,\phi) \quad \text{Expression 9}$$

Here, $\hat{\lambda}_m$ and $\hat{e}_m$ are new eigenvalues and eigenvectors.

The noises are whitened by Expression 9. If K is a regular matrix, Expression 10 can be obtained from Expression 9 and the eigenvalue decomposition is simplified.

$$K^{-1}(\omega,\phi)R(\omega,\phi)\hat{e}_m(\omega,\phi)=\hat{\lambda}_m \hat{e}_m(\omega,\phi) \quad \text{Expression 10}$$

When the noises are uncorrelated to the target sounds, K is not a regular matrix. However, in many cases of the robotic sound source localization, the noises and the target sounds are correlated to each other and thus Expression 10 is valid.

The GEVD spatial spectrum is expressed by Expression 11.

$$\hat{P}(\omega,\psi) = \frac{|G^*(\omega,\psi) \cdot G(\omega,\psi)|}{\sum_{m=L+1}^{M} |G^*(\omega,\psi) \cdot \hat{e}_m|} \quad \text{Expression 11}$$

In the GEVD method, all noises are suppressed and $e_{L+1}, \ldots, e_M$ are not selected as the eigenvectors. That is, the GEVD method is a robust localization method for noises.

Target Source Selection

In the target source selection, a specific sound is selected using the GEVD method. The inverse matrix of $K(\omega,\phi)$ in Expression 10 can be considered as a "cancel operator" for cancelling noises $N(\omega,\phi)$ from the correlation matrix $R(\omega,\phi)$. On the contrary, $R(\omega,\phi)$ in Expression 10 can be considered as a "focus operator" for focusing the sounds and the noises.

The main idea of the target source selection is based on the cancel operator and the focus operator. By the selection of the cancel operator and the focus operator, a desired localization environment can be designed. Accordingly, assuming that plural sounds are not detected at the same time, the operators of the sounds are calculated. First, when no sound is in the environment, the robot's own environmental noise $N(\omega,\phi)$, which is pre-measured by $\phi$ in advance, is sensed by the microphone array and the noise correlation matrix $K(\omega,\phi)$ thereof is calculated.

Then, the first sound $S_1(\omega,\theta_1)$ is sensed by the microphone array and a new correlation matrix $R_1(\omega,\phi,\theta_1)$ of the measured signal $X(\omega)$ is obtained as expressed by Expression 12. Expression 12 has information on both the environmental noise and the first sound.

$$X(\omega)=A_1(\omega,\phi,\theta_1)S_1(\omega,\theta_1)+N(\omega,\phi) \quad \text{Expression 12}$$

Since $K^{-1}(\omega,\phi)$ cancels the noise elements from $R_1(\omega,\phi)$, the correlation matrix $C_1(\omega,\phi)$ of the first sound is expressed by Expression 13. Intuitively, $C_1(\omega,\phi)$ can be considered to be the correlation matrix of $A_1(\omega,\phi,\theta_1)S_1(\omega,\theta_1)$. Strictly speaking, it is assumed that the noise and the sound are uncorrelated to each other so that Expression 13 does not include a cross term.

$$C_1(\omega,\phi)=K^{-1}(\omega,\phi)R_1(\omega,\phi) \quad \text{Expression 13}$$

Similarly, the second sound is sensed to obtain $R_2(\omega,\phi)$ and the correlation matrix $C_2(\omega,\phi)$ of the second sound is obtained as expressed by Expression 14.

$$C_2(\omega,\phi)=C_1^{-1}(\omega,\phi)K^{-1}(\omega,\phi)R_2(\omega,\phi) \quad \text{Expression 14}$$

Similarly, the above-mentioned process is repeated up to the L-th sound and the correlation matrices $C_1, \ldots, C_L$ are obtained. The general term of $C_l$ is described by Expression 15.

$$C_l(\omega, \phi) = \prod_{i=1}^{l} C_i^{-1}(\omega, \phi)K^{-1}(\omega, \phi)R_l(\omega, \phi) \quad \text{Expression 15}$$

Figure 7:
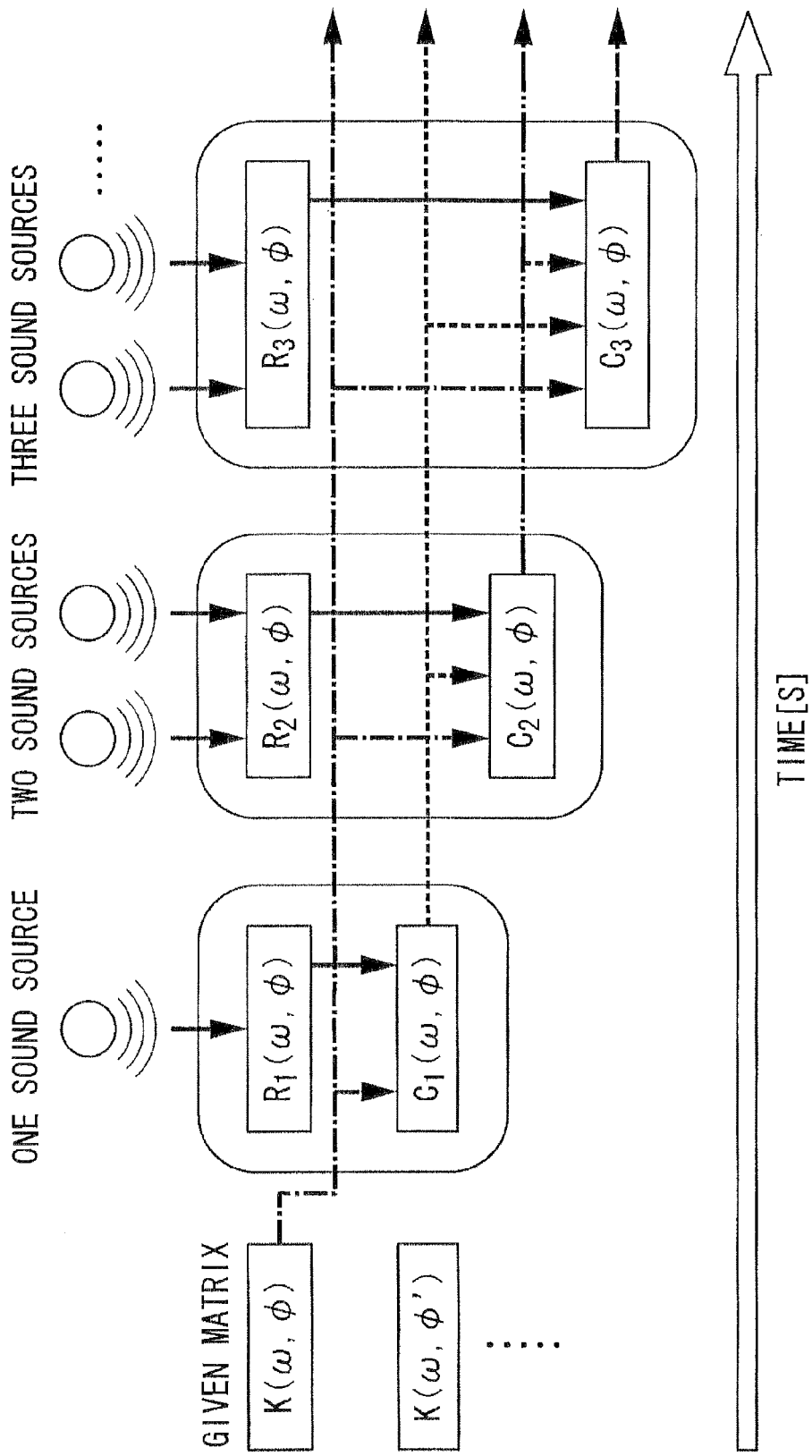
FIG. 7 is a diagram schematically illustrating steps of deriving each correlation matrix.

Here, $C_l$ is the focus operator for the l-th sound and $C_l^{-1}$ is the cancel operator for the l-th sound $A_l(\omega,\phi,\theta_l)S_l(\omega,\theta_l)$. FIG. 7 is a diagram schematically illustrating the steps of driving each correlation matrix. In FIG. 7, the steps are expressed in the hierarchy structure and it is easy to be implemented to the real equipment algorithmically.

In cancelling and focusing arbitrary sounds, $V(\omega,\phi)$ is defined as a designed correlation matrix. That is, the general form of $V(\omega,\phi)$ is described by Expression 16.

$$V(\omega, \phi) = \prod_{i=1}^{L} C_i^{p_i}(\omega, \phi)K^{-1}(\omega, \phi) \quad \text{Expression 16}$$

Here, $p_i$ is an integer in the range of $-1 \leq p_i \leq 1$.

Expression 10 can be rewritten as Expression 17 and can localize arbitrary sounds.

$$V(\omega,\phi)R(\omega,\phi)\hat{e}_m(\omega,\phi)=\hat{\lambda}_m \hat{e}_m(\omega,\phi) \quad \text{Expression 17}$$

Dynamic FoA

In Expression 16, $p_i$ is only an integer and the focusing and cancelling of sounds is thus discretely carried out in the target source selection, whereby the intelligent localization is not implemented. The dynamic FoA is necessary for the implementation of the intelligent localization.

The main idea of the dynamic FoA is to transform each $C_l$ continuously from 1 to $C_l^{-1}$ or from $C_l^{-1}$ to 1. Here, $C_l^{-1}$ is used for the decaying as described above, but $C_l^1$ is used instead of $C_l^{-1}$ for the focusing. The eigenvalue decomposition of $C_l^{-1}$ is described by Expression 18.

$$C_l^{-1}(\omega,\phi)=E_l(\omega,\phi)\Lambda_l^{-1}E_l^{-1}(\omega,\phi) \quad \text{Expression 18}$$

Here, $\Lambda_l^{-1}=\text{diag}(\lambda_{l,1}^{-1}, \ldots, \lambda_{l,M}^{-1})$ is assumed.

For the decaying, Expression 19 is defined. A decay parameter $D_l$ is continuously changed from 0 to −1 depending on the importance of each sound. Specifically, the decay does not occur when the decay parameter $D_l$ is 0, the degree of decay increases as the decay parameter gets close to −1, and the degree of decay is the greatest when the decay parameter is −1. Since the decay parameter $D_l$ has the above-mentioned features, various setting examples can be considered in practical use. For example, localizing a sound of interest, a degree of interest for the sound may be set and $D_l$ may be set depending on the degree of interest. Specifically, as the degree of interest for a sound becomes lower, the value is set to be closer to −1. For example, in localizing a sound with a high degree of speech recognition, $D_l$ may be set depending on the degree of speech recognition. Specifically, as the degree of speech recognition becomes lower, the value is set to be closer to −1. That is, the value may be set to be close to −1 with a decrease in the degree. With the lapse of time after the robot senses a sound, the decay parameter may be slowly made to be smaller.

$$C_l^{Dl}(\omega,\phi)=E_l(\omega,\phi)\mathrm{diag}(\lambda_{l,1}^{D1},\ldots,\lambda_{l,M}^{Dl})E_l^{-1}(\omega,\phi) \quad \text{Expression 19}$$

When a human hears a new sound, the human listens to the new sound, checks if the sound is to be listened, and gradually cancels the sound. The dynamic FoA achieves such an intelligent localization.

Correlation Matrix Estimation

The sound source localization with the rotation of the robot head will be described. The correlation matrix estimation is to solve the problem that the orientation of the microphone array and the directions of target sounds and noises are changed with the rotation of the head. The orientation $\phi$ of the head is set as a variable.

As described above, even when $C_l(\omega,\phi)$ is acquired from Expression 15, the rotation of the head from $\phi$ to $\phi'$ changes $C_l(\omega,\phi)$ to $C_l(\omega,\phi')$ for all the correlation matrices. Accordingly, the estimation from $C_l(\omega,\phi)$ to $C_l(\omega,\phi')$ is necessary. The steering vector $G(\omega,\psi)$ is used for the estimation. As described in the target source selection, $C_l(\omega,\phi)$ can be considered as the correlation matrix of $A_l(\omega,\phi,\theta_l)S_l(\omega,\theta_l)$. That is, it is described by Expression 20.

$$C_l(\omega,\phi) = \{A_l(\phi,\theta_l)S_l(\theta_l)\}\{A_l(\phi,\theta_l)S_l(\theta_l)\}^*$$
$$= A_l(\phi,\theta_l)A_l^*(\phi,\theta_l)S_l(\theta_l)S_l^*(\theta_l) \quad \text{Expression 20}$$

In Expression 20, since $S_lS_l^*$ is not dependent on $\phi$, the transformation matrix $T_l(\omega,\phi,\phi')$ of $C_l(\omega,\phi)$ from $\phi$ to $\phi'$ is defined as Expression 21.

$$T_l(\omega,\phi,\phi^1)=\{A_l(\phi)A_l^*(\phi)\}^{-1}\{A_l(\phi^1)A_l^*(\phi^1)\} \quad \text{Expression 21}$$

That is, the post-rotated correlation matrix $\hat{C}_1(\omega,\phi,\phi')$ after the head rotates from $\phi$ to $\phi'$ is described by Expression 22 using the pre-rotated correlation matrix $C_l(\omega,\phi)$ and the transformation matrix $T_l(\omega,\phi,\phi')$.

$$\hat{C}_l(\omega,\phi,\phi')=T_l(\omega,\phi,\phi')C_l(\omega,\phi) \quad \text{Expression 22}$$

System Implementation

The GEVD, the target source selection, the dynamic FoA, and the correlation matrix estimation have a feature that their functions are sound-independent operations. Accordingly, the functions can be easily implemented algorithmically. Since the operations can deal with sounds one by one dynamically, the selective attention system can be highly adapted to various environmental changes.

For example, the operations steps for the localization are described in the following order:

1. Determination of $R_l(\omega,\phi)$ (1≤l≤L);
2. Determination of $C_l(\omega,\phi)$ by Expression 15;
3. Determination for target source selection by $\dot{p}_l$ in Expression 16;
4. Decision for the dynamic FoA by defining $D_l$ in Expression 19 depending on importance of sounds; and
5. Transformation of $C_1(\omega,\phi)$ by Expression 22 with head rotation.

In this work, Honda ASIMO with an embedded 8-ch microphone array is used as a robot for the experimental validation. The position of the array is on its head, and it has a uniform-circular-array-like geometry. Two speakers are located at 60° and −60° of the front side of ASIMO, and emit different sounds (may emit the same sound). The distance between ASIMO and the sounds is 1 m, which is deemed to be far field with respect to the microphone array. ASIMO has its own fan on the back side, which is regarded as a loud environmental noise. The sounds lower than the fan noise are used for the validation of the GEVD. The architecture of the experimental setup is shown in FIG. 6. The control PC and ASIMO are connected through a wireless network. ASIMO sends data of the sounds recorded by the array and the PC sends the angle for its head rotation. For the real time processing, all the proposed functions are implemented as component blocks of HARK robot audition software based on FlowDesigner, which is C++ based code. All the operations on the PC side are carried out by a laptop with a 2.5 GHz Intel Core 2 Duo and a 2 GB SDRAM running linux.

Evaluation

Here, the validity of the proposed methods is evaluated by both simulation and experiment. The common conditions for the evaluation are as follows.

$K(\omega,\phi)$ is given by 5° of the head angle.

There are 2 sounds at 60° and −60°.

Main environmental noise comes from a position of an angle of 180°.

The power of environmental noise $N(\omega,\phi)$ is stronger than that of sounds to be localized.

The sound from a position of an angle of −60° is first detected and the sound from a position of an angle of 60° is then detected.

The steering vector $G(\omega,\psi)$ is given by 5°. That is, $\psi=\{-175, -170, \ldots, 180\}$ [deg].

The head rotation is done when the robot detects a sound and tries to face the sounds. Therefore, $C_1(\omega,\phi)$ corresponds to the sound from −60° and $C_2(\omega,\phi)$ corresponds to the sound from 60°.

Figure 8:
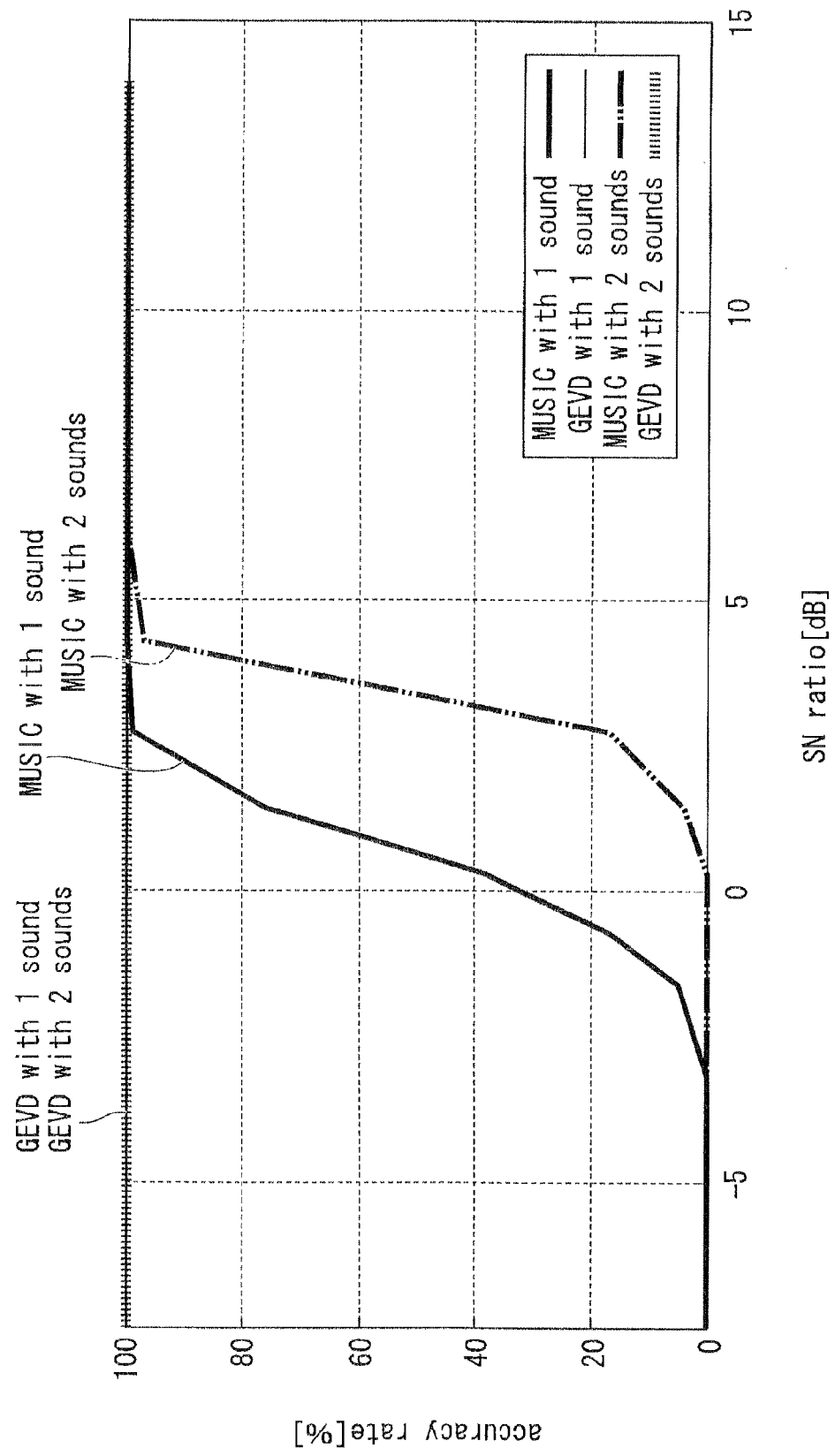
FIG. 8 is a diagram illustrating the comparison result of the MUSIC method and the GEVD method.

First, the MUSIC method and the GEVD are compared numerically to represent how strong the GEVD is to the environmental noises. It is assumed for the evaluation that the head orientation is fixed to 0°. FIG. 8 is a diagram illustrating the comparison result between the MUSIC method and the GEVD. In FIG. 8, the horizontal axis represents the signal-to-noise (SN) ratio and the vertical axis represents the localization accuracy. The graph indicates the number of frames which detected peaks of sounds in 100 blocks. The MUSIC method and the GEVD were compared for the 1- and 2-sounds localization. In both cases, the MUSIC performance was obviously degraded because of the assumption of "the power of the environmental noises $N(\omega,\phi)$ is stronger than that of the sounds to be localized". On the other hand, the GEVD perfectly localized the sounds even when the SN ratio goes negative. In all cases, the GEVD was more robust against noises than the MUSIC method. The validity of the GEVD is successfully verified.

The selective attention system is evaluated. FIGS. 9A to 9D are diagrams illustrating the snapshots of the experiment with the selective attention system. The sound used in the experiment are much smaller than the fan noise and satisfies the assumption of "the power of the environmental noises $N(\omega,\phi)$ is stronger than that of the sounds to be localized". The robot rotates its head so as to face the localized sound source.

FIG. 9A shows the first phase of the experiment. Here, $\phi$ is now 0° and the speaker at −60° starts emitting the low clock-alarm sound $s_1(t,-60)$. The right side of FIG. 9A shows the spatial spectrum of both the MUSIC (actually, the SEVD which is a modification of the MUSIC method) and the GEVD when the robot hears the sound. As shown in FIG. 9A, the MUSIC detects a high peak in the direction toward the fan noise which is on the back side of the robot (180° in FIG. 9A). Therefore, in the MUSIC, the robot does not rotate its head toward the sound source. On the other hand, since the GEVD can cancel the noise using K(ω,0), the peak is apparently on the front side of the robot (−60°). Therefore, in the GEVD, the robot successfully rotates its head so as to face the sound source even under loud noise environment. The noise robustness of the GEVD is clearly confirmed by the experiment result.

Figure 9B:
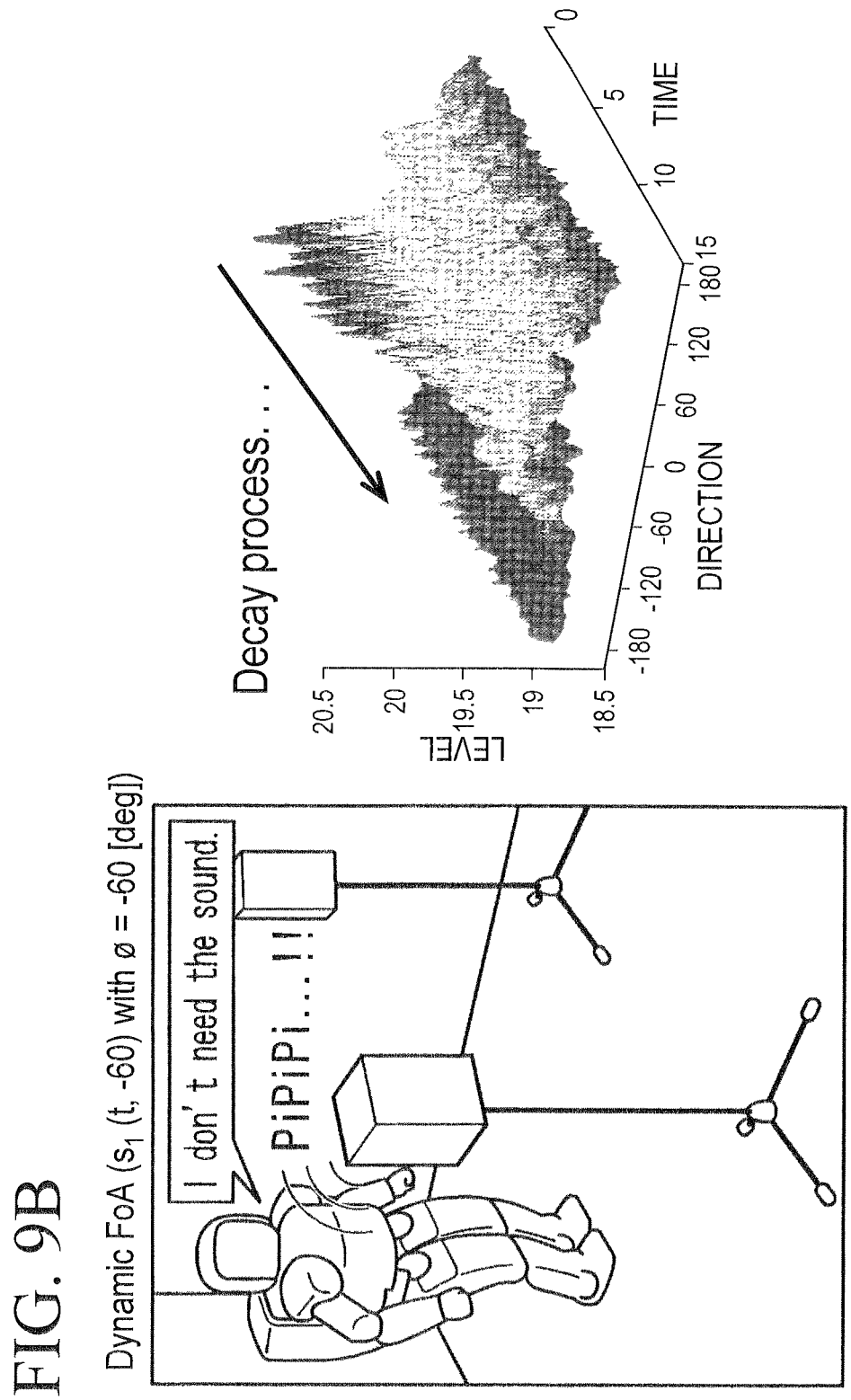

FIG. 9B shows the second phase of the experiment. The robot faces to $s_1(t,-60)$ and tries to cancel the sound using the dynamic FoA. First, a correlation matrix $R_1(\omega,-60)$ is calculated, and then a correlation matrix $C_1(\omega,-60)$ is derived to hear the new sound. The dynamic FoA starts working when $C_1(\omega,-60)$ is determined by Expression 23. It is seen that the function is also working properly (see the right side of FIG. 9B). When the cancelling of the sound is finished, it gets ready to hear new sounds.

$$C_1(\omega,-60)=K^{-1}(\omega,-60)R_1(\omega,-60) \qquad \text{Expression 23}$$

Figure 9C:
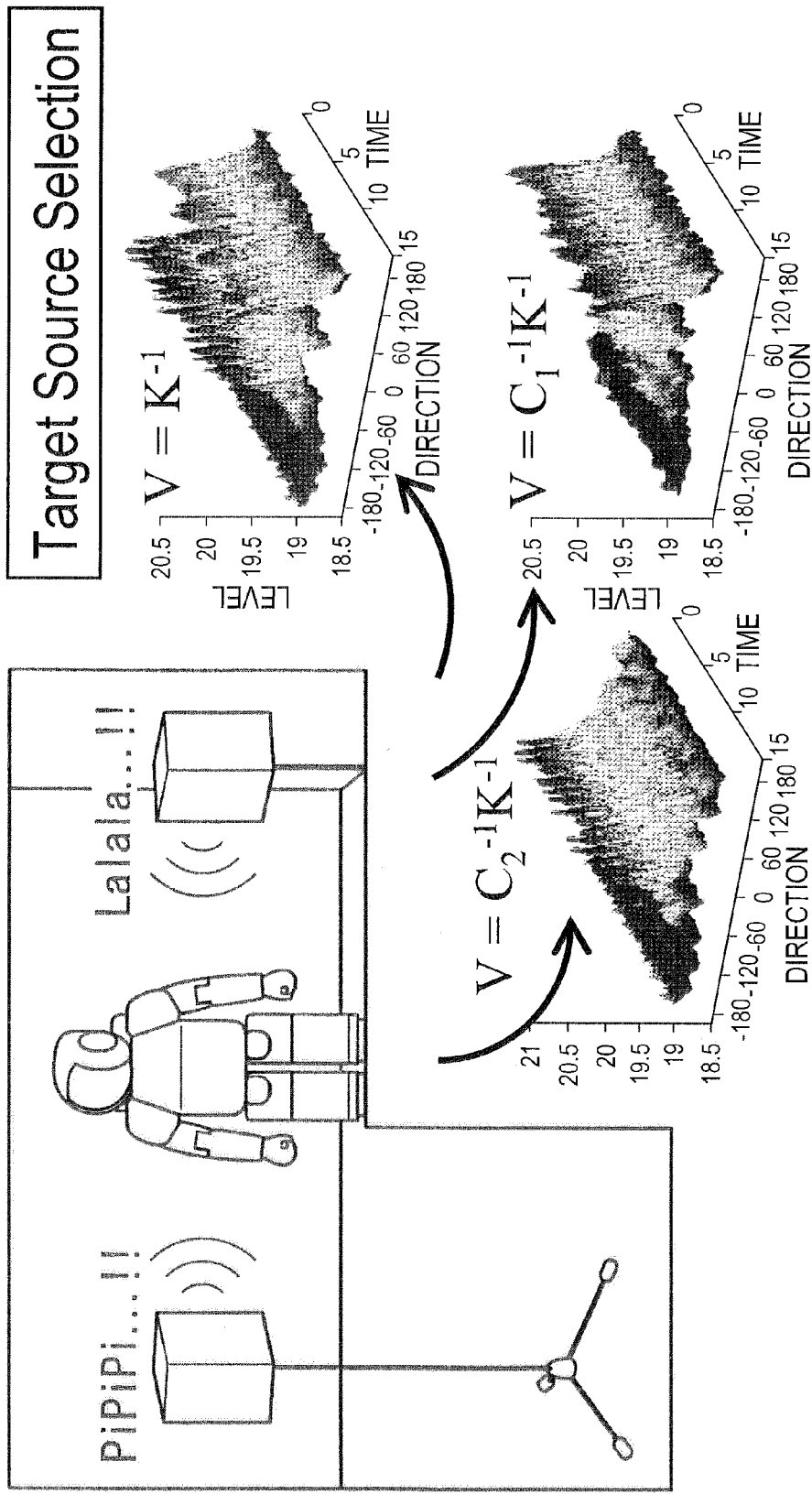

In FIG. 9C, the speaker at 60° emits low music sound $s_2(t,60)$. The robot currently has the correlation matrices $K_1(\omega,-60)$, $R_1(\omega,-60)$, and $C_1(\omega,-60)$. When the robot hears the new sound, $C_2(\omega,-60)$ is obtained from $R_2(\omega,-60)$ using an equation of $C_2(\omega,-60)=C_1^{-1}(\omega,-60)K^{-1}(\omega,-60)R_2(\omega,-60)$. Therefore, it can decide focusing or cancelling of each sound using the target source selection. The right side of FIG. 9C shows the result. The selective attention system can select a desired sound by appropriate design of the correlation matrices.

In FIG. 9D, the robot faces to $s_2(t,60)$. Since the robot does not have the correlation matrices $C_1(\omega,60)$ and $C_2(\omega,60)$, the correlation matrix estimation is applied. The estimated matrices are derived from Expressions 24 and 25.

$$\hat{C}_1(\omega,-60,60)=T_1(\omega,-60,60)C_1(\omega,-60) \qquad \text{Expression 24}$$

$$\hat{C}_2(\omega,-60,60)=T_2(\omega,-60,60)C_2(\omega,-60) \qquad \text{Expression 25}$$

The right side of FIG. 9D shows the localization result using Expression 26.

$$V(\omega,60)=\hat{C}_2^{-1}(\omega,-60,60)K^{-1}(\omega,60) \qquad \text{Expression 26}$$

As shown in FIG. 9D, since the peak for the target sound is the highest, the estimation also works in the real environment. As described above, the validity of each function is successfully confirmed only by the numerical simulation but also by the experiment.

Details of Eigenvector Calculator

The eigenvector calculator 120 will be described in detail based on the above description. In FIGS. 2 and 6, the microphone array 100 corresponds to function A, the correlation matrix calculator 110 corresponds to functions B, C, and D, the eigenvector calculator 120 corresponds to functions E, F, and G, the sound source localization unit 130 corresponds to function H, and the driving controller 140 corresponds to functions I and J.

Figure 12A:
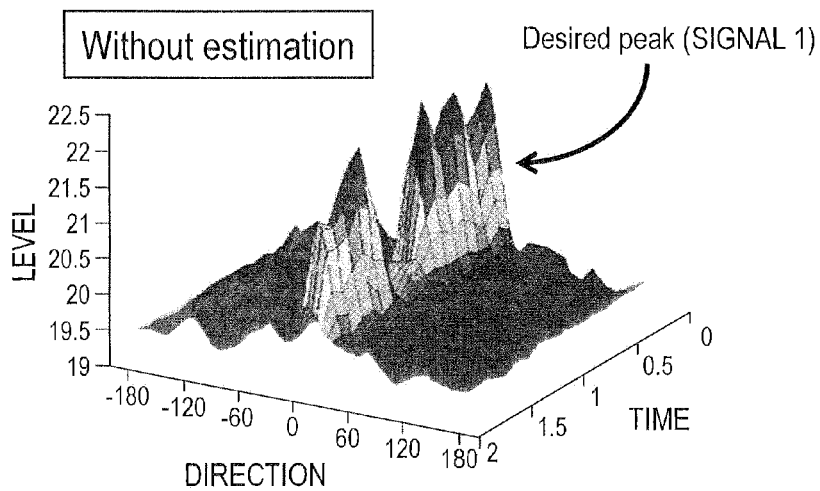
Figure 12B:
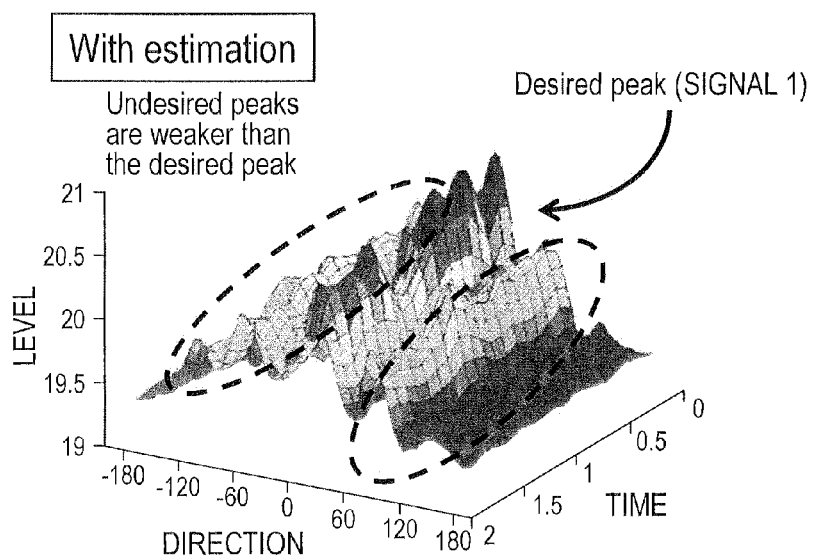

FIGS. 10A to 12B are diagrams schematically illustrating the function of the eigenvector calculator 120. FIG. 10C is identical to the figure included in function E in FIG. 6, FIG. 11B is identical to the figure included in function F in FIG. 6, FIG. 12B is identical to the figure included in function G in FIG. 6. In FIGS. 10C, 11B, and 12B, the scales of the directions and powers of signal 1 and signal 2 are not adjusted to coincide for the convenience of explanation. In the following description, character "X^" means that ^ is attached to character X.

The localization of a desired signal will be described with reference to FIGS. 10A, 10B, and 10C. In the following description, it is assumed that the correlation matrix calculator 110 acquires input signals s as plural sounds, which include noise n from a noise source, signal 1 from a sound source 1, and a signal 2 from a sound source 2, from the microphone array 100. It is also assumed that the noise correlation matrix K of noise n, the correlation matrix $C_1$ of signal 1, and the correlation matrix $C_2$ of signal 2 are calculated as predetermined correlation matrices by the correlation matrix calculator 110 (Expression 8 and 15) and are stored in advance (function B in FIG. 6).

Figure 10C:
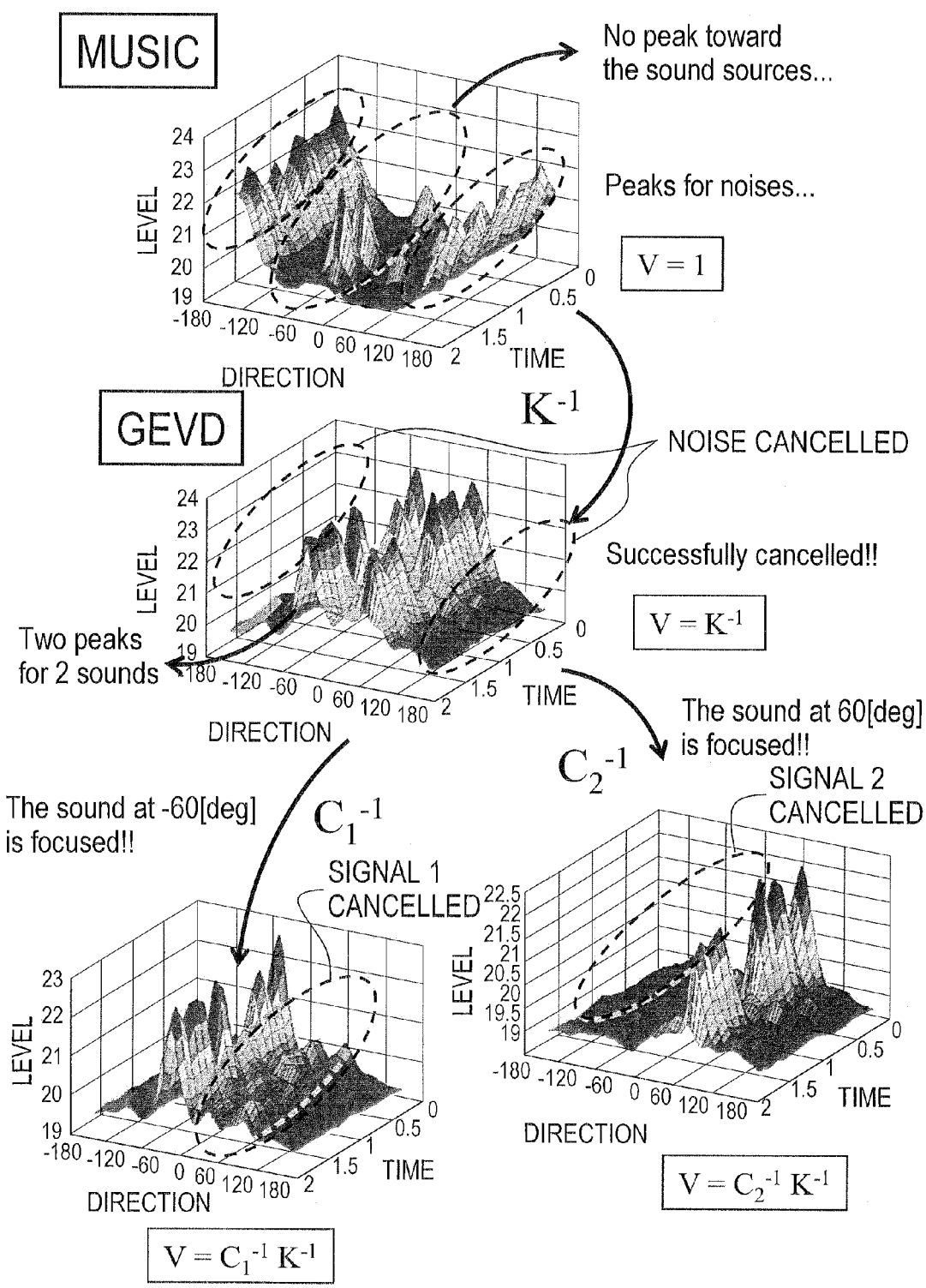

For example, when a signal 1 is to be localized, the eigenvector calculator 120 calculates an eigenvector $e_m\hat{}$ using the correlation matrix R of the input signals s, the noise matrix K, and the correlation matrix $C_2$ (Expression 17), as shown in FIG. 10A. Then, the sound source localization unit 130 localizes the signal 1 using the eigenvector $e_m\hat{}$ (Expression 11). That is, as shown in FIG. 10C, the noise and the signal 2 are cancelled and the peak of the signal 1 is marked (the right-lower side of the drawing) using $C_2^{-1}K^{-1}$, thereby localizing the signal 1.

Similarly, when the signal 2 is to be localized, the eigenvector calculator 120 calculates an eigenvector $e_m\hat{}$ using the correlation matrix R of the input signals s, the noise matrix K, and the correlation matrix $C_1$, as shown in FIG. 10B. Then, the sound source localization unit 130 localizes the signal 2 using the eigenvector $e_m\hat{}$. That is, as shown in FIG. 10C, the noise and signal 1 are cancelled and the peak of the signal 2 is marked (the left-lower side of the drawing) using $C_1^{-1}K^{-1}$, thereby localizing the signal 2.

When merely noise is to be cancelled, it is sufficient for the eigenvector calculator 120 to calculate the eigenvector $e_m\hat{}$ using the correlation matrix R of the input signals s and the noise correlation matrix K.

The sound source localization unit 130 outputs ψ as the localization result to the driving controller 140. The driving controller 140 acquiring ψ calculates the head orientation φ on the basis of ψ. The driving controller 140 calculating φ outputs control information including φ to the head 42 to rotate the head 42 and outputs φ to the eigenvector calculator 120. The eigenvector calculator 120 acquiring φ stores φ as microphone posture information. The microphone posture information is information representing the posture of the microphone array 200 (the posture of the head 42).

The adjustment of the degree of cancellation of a signal will be described with reference to FIGS. 11A and 11B. In the cases of FIGS. 10A, 10B, and 10C, the noise and the signal 2 are cancelled when the signal 1 is to be localized. However, when the degree of cancellation of the signal 2 is to be adjusted, the eigenvector calculator 120 corrects the correlation matrix $C_2$ into the correlation matrix $C_2^{D2}$ (Expression 19) and calculates the eigenvector $e_m\hat{}$ of the correlation matrix $C_2^{D2}$ as shown in FIG. 11A. That is, as shown in FIG. 11B, by changing the value of $D_2$ depending on the degree of interest, the degree of cancellation of signal 2 can be adjusted. A similar process can be applied to adjustment of the degree of cancellation of the signal 1. That is, since a predetermined correlation matrix is corrected by the eigenvector calculator 120 and the eigenvector of the predetermined correlation matrix is changed, it is possible to adjust the power of the measured signal (for example, numerical values (level) in the height direction of the three-dimensional images shown in FIGS. 9 to 12B). For the convenience of explanation, the noise is not shown in FIG. 11B.

The rotation of the head 42 will be described with reference to FIGS. 12A and 12B. In FIGS. 10A, 10B, and 10C and FIGS. 11A and 11B, the degree of cancellation of signal 2 is adjusted. However, when the head 42 is rotated, the eigenvector calculator 120 corrects the correlation matrix $C_2^{D2}$ into the correlation matrix $C_2^{D2^\sim}$ (Expression 22) on the basis of the microphone posture information ($\phi$), and calculates the eigenvector $\hat{e}_m$ of the correlation matrix $C_2^{D2^\sim}$, as shown in FIG. 12A. Then, the sound source localization unit 130 adjusts the degree of cancellation of signal 2 using the eigenvector $\hat{e}_m$ and localizes signal 1 in consideration of the rotation of the head 42 (Expression 11), as shown in FIG. 12B. For example, in the example shown in FIG. 12B, the peak before the rotation is 0°; however, the peak after the rotation is −60°.

According to the above-described embodiment, it is possible to localize a sound source correctly in the system including a stationary noise source. In a system including plural sound sources, it is also possible to localize a specific sound source correctly. In the subsequent processes such as sound source separation and speech recognition, it is possible to separate and recognize a desired sound source properly. In addition, it is possible to localize a sound source correctly depending on the microphone posture without preparing various correlation matrices corresponding to the microphone postures beforehand.

In the embodiment, the eigenvector calculator 120 stores the microphone posture information ($\phi$); however, the driving controller 140 instead of the eigenvector calculator 120 may store the microphone posture information ($\phi$). When the driving controller 140 stores the microphone posture information ($\phi$), the driving controller 140 outputs the microphone posture information ($\phi$) to the eigenvector calculator 120 in response to the request from the eigenvector calculator 120.

In the embodiment, $\phi$ calculated from $\psi$ output from the sound source localization unit 130 is used as the microphone posture information, but the head function unit 150 and the like may actually measure the posture of the head 42 and use the measurement result as the microphone posture information, instead of using $\phi$ as the microphone posture information. When the actual measurement result is used as the microphone posture information, the head function unit 150 and the like can measure the posture of the head 42 in response to the request from the eigenvector calculator 120, thereby making it unnecessary to store the microphone posture information.

The above-mentioned operations of the sound source localization apparatus 1 according to the embodiment of the invention may be performed by recording a program for performing the operations of the sound source localization apparatus 1 according to the embodiment of the invention in a computer-readable recording medium and causing a computer system to read the program recorded in the recording medium and to execute the program. Here, the "computer system" includes an OS or hardware such as peripherals. The "computer system" includes a homepage providing environment (or display environment) in using a WWW system. Examples of the "computer-readable recording medium" include memory devices of portable mediums such as a flexible disk, a magneto-optical disk, a ROM, a writable nonvolatile memory such as a flash memory, and a CD-ROM, a hard disk built in the computer system, and the like.

The "computer-readable recording medium" may include a recording medium keeping a program for a predetermined time, such as a volatile memory (for example, DRAM (Dynamic Random Access Memory) in the computer system serving as a server or a client when the program is transmitted via a network such as Internet or a communication line such as a phone line. The program may be transmitted to another computer system from the computer system having the program stored in the memory device or the like via a transmission medium or transmission waves in a transmission medium. Here, the "transmission medium" for transmitting a program means a medium having a function of transmitting information, such as networks (communication networks) like Internet or communication circuits (communication lines) like phone lines. The program may embody a part of the above-mentioned functions. The program may embody the above-mentioned functions in cooperation with a program previously recorded in the computer system, that is, may be a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sound source localization apparatus, comprising:
   a sound signal input unit inputting a sound signal and environmental noise;
   a correlation matrix calculation unit configured to:
      calculate a correlation matrix of the input sound signal, focus or cancel the input sound signal using the calculated correlation matrix for the input sound signal; and
      calculate a noise correlation matrix based on the environmental noise;
   a rotation determining unit for determining a degree of rotation of the sound signal input unit;
   an eigenvector calculation unit calculating an eigenvector of the correlation matrix using the calculated correlation matrix; and
   a sound source localization unit configured to:
      cancel the environmental noise using an inverse matrix of the noise correlation matrix; and
      localize a sound source using an eigenvector and a generalized eigenvalue decomposition,
   wherein the eigenvector calculation unit:
      calculates the eigenvector using the correlation matrix of the input sound signal and one or more predetermined correlation matrices; and
      transforms the correlation matrix based on the degree of rotation determined by the rotation determining unit; and
   a decay parameter in the generalized eigenvalue decomposition of the eigenvector is changed based on a degree of speed recognition.

2. The sound source localization apparatus according to claim 1, wherein the eigenvector calculation unit includes a correction unit correcting a predetermined correlation matrix and changes the eigenvector of the predetermined correlation matrix.

3. The sound source localization apparatus according to claim 1, further comprising a microphone posture information storage unit storing microphone posture information indicating a microphone posture,
   wherein the eigenvector calculation unit corrects the correlation matrix on the basis of the microphone posture information.

4. A sound source localization method, comprising:
   a sound signal input step of inputting a sound signal and environmental noise using a sound signal input unit;

a correlation matrix calculation step of calculating a correlation matrix of the input sound signal, and focusing or canceling the input sound signal using the calculated correlation matrix for the input sound signal, and calculation a noise correlation matrix based on the environmental noise;

a rotation determining step of determining a degree of rotation of the sound signal input unit;

an eigenvector calculation step of calculating an eigenvector of the correlation matrix using the calculated correlation matrix; and a sound source localization step of canceling the environmental noise using an inverse matrix of the noise correlation matrix, and localizing a sound source using a eigenvector and a generalized eigenvalue decomposition, wherein, in the eigenvector calculation step, the eigenvector is calculated using the correlation matrix of the input sound signal and one or more predetermined correlation matrices, and the correlation matrix is transformed based on the degree of rotation determined in the rotation determining step; and changing a decay parameter in the generalized eigenvalue decomposition of the eigenvector based on a degree of speech recognition.

* * * * *